United States Patent [19]

Nakajima et al.

[11] 4,283,783

[45] Aug. 11, 1981

[54] DRIVE CONTROL SYSTEM FOR STEPPING MOTOR

[75] Inventors: Fumio Nakajima; Takayasu Machida; Kenji Yamada; Fumio Kanno, all of Tokorozawa, Japan

[73] Assignee: Citizen Watch Company Limited, Tokyo, Japan

[21] Appl. No.: 96,450

[22] Filed: Nov. 21, 1979

[30] Foreign Application Priority Data

| | | | |
|---|---|---|---|
| Nov. 28, 1978 | [JP] | Japan | 53/145983 |
| Dec. 5, 1978 | [JP] | Japan | 53/150909 |
| Jul. 26, 1979 | [JP] | Japan | 54/94256 |

[51] Int. Cl.[3] .................. G04B 19/00; G04C 3/00; G05B 19/40

[52] U.S. Cl. .................. 368/76; 368/218; 318/696

[58] Field of Search .................. 58/4 A, 23 R, 23 D, 58/58; 318/696; 368/76, 80, 85-87, 200-202, 217-219, 155-157

[56] References Cited

U.S. PATENT DOCUMENTS

| | | | |
|---|---|---|---|
| 3,812,670 | 5/1974 | Nikaido et al. | 58/23 R |
| 4,031,448 | 6/1977 | Adachi | 318/696 |
| 4,032,827 | 6/1977 | Dobkatz | 58/23 D |
| 4,204,397 | 5/1980 | Asano et al. | 368/202 |
| 4,209,971 | 7/1980 | Ueda et al. | 368/76 |
| 4,217,751 | 8/1980 | Torisawa et al. | 368/76 |

*Primary Examiner*—Vit W. Miska
*Attorney, Agent, or Firm*—Holman & Stern

[57] ABSTRACT

In an electronic timepiece having a stepping motor which drives time indicating means, a system is provided for detecting an increase in the load torque on the stepping motor above a predetermined level. When such an increase is detected, the conditions for detection of the load on the stepping motor are changed, and thereafter drive pulses of increased power are applied to the stepping motor. When the increased load is removed, this is detected under the new set of detection conditions, and a return to the original detection conditions is executed, with the drive pulse power being returned to the original level. Stability of control is thereby provided, together with immediate response to increased load on the stepping motor.

39 Claims, 25 Drawing Figures

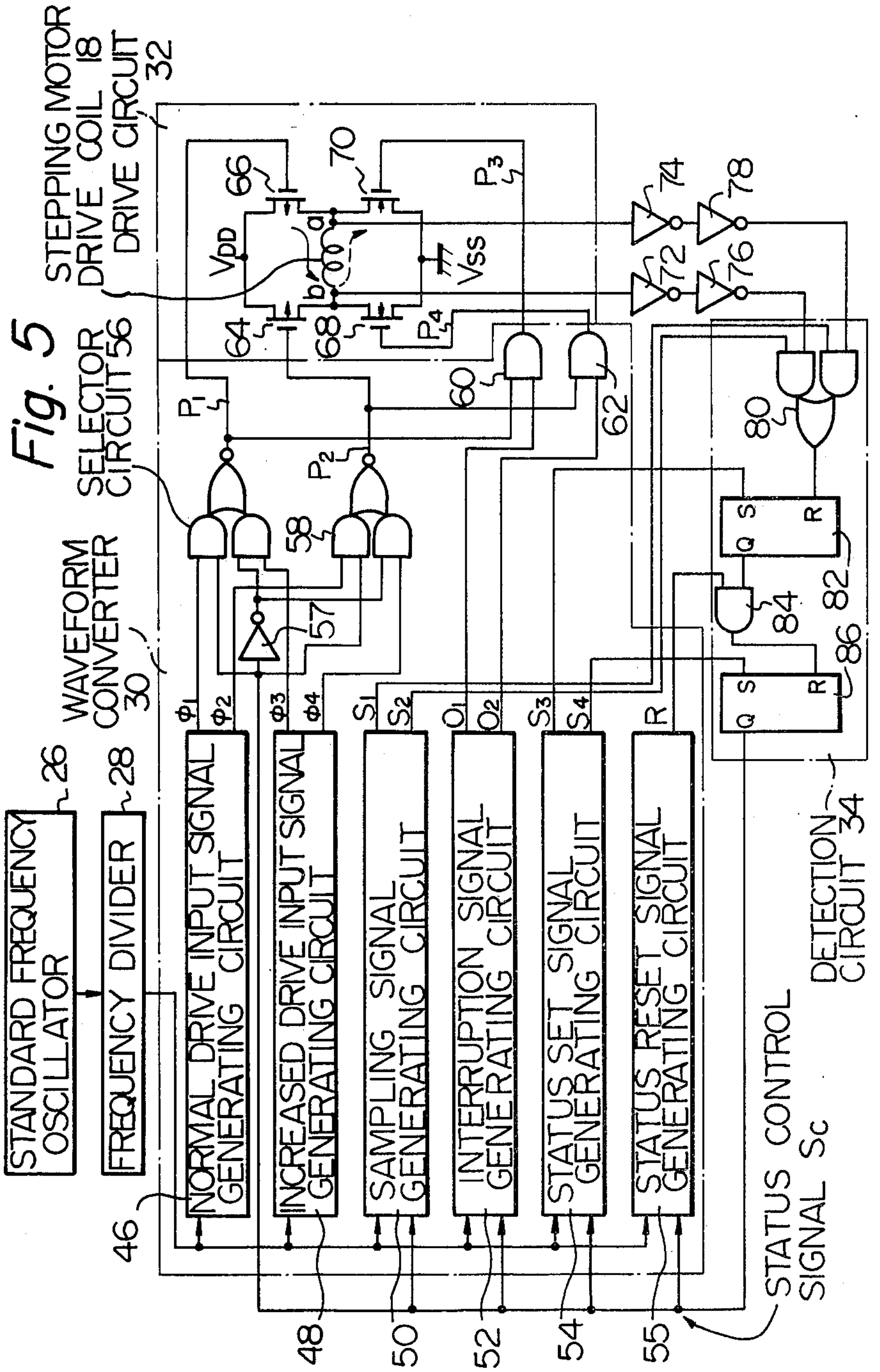
Fig. 5
STANDARD FREQUENCY OSCILLATOR
26
FREQUENCY DIVIDER
28
NORMAL DRIVE INPUT SIGNAL GENERATING CIRCUIT
46
INCREASED DRIVE INPUT SIGNAL GENERATING CIRCUIT
48
SAMPLING SIGNAL GENERATING CIRCUIT
50
INTERRUPTION SIGNAL GENERATING CIRCUIT
52
STATUS SET SIGNAL GENERATING CIRCUIT
54
STATUS RESET SIGNAL GENERATING CIRCUIT
55
STATUS CONTROL SIGNAL Sc
WAVEFORM CONVERTER 30
SELECTOR CIRCUIT 56
STEPPING MOTOR DRIVE COIL 18
DRIVE CIRCUIT 32
DETECTION CIRCUIT 34
φ1 φ2 φ3 φ4
S1 S2 O1 O2 S3 S4 R
P1 P2 P3 P4
VDD VSS
a b
57 58 60 62 64 66 68 70 72 74 76 78 80 82 84 86
Q S R

DRIVE CONTROL SYSTEM FOR STEPPING MOTOR

BACKGROUND OF THE INVENTION

At the present time, electronic timepieces which employ a stepping motor to drive time indicating means are in widespread use. There is an increasing demand for reduction of size, or increased duration of battery life for such timepieces, through reduction of the power consumption. Most of the power consumed in such a timepiece is utilized in driving the stepping motor, which in turn drives time indicating hands, and generally also a date display, through a gear train. In order to reduce power consumption to a minimum, it is obviously desirable to reduce the power applied to the stepping motor to the minimum level which is consistent with reliable operation. However, in the case of a timepiece which incorporates auxiliary time indicating means, such as date display, in addition to the time indicating hands, a difficulty arises in setting the drive power of the stepping motor to the minimum degree. This difficulty is due to the fact that the drive power required to be applied to the stepping motor when a date display is being actuated is considerably higher than that which is required when only the time indicating hands are being driven. Various methods have been proposed therefore for determining the load which is currently being applied to the stepping motor, and controlling the drive power applied to the stepping motor in accordance with the level of load. The stepping motor is generally driven by drive pulses (or drive pulse bursts, as explained hereinafter) of successively alternating polarity, with a period of one second between each drive pulse. Among the methods which have been proposed in the prior art have been those of providing an auxiliary winding adjacent to the drive coil of the stepping motor, and to detect the peak value of the voltage developed in this auxiliary winding, when a drive pulse is applied, to thereby detect a condition of increased load applied to the motor (U.S. Pat. No. 3,855,781 by Chihara et al). This has the disadvantage that a special type of stepping motor must be used. Another proposal has been to open-circuit the terminals of the stepping motor drive coil for a short time immediately after the cessation of each drive pulse, and to detect the voltage developed across the stepping motor drive coil at that time.

However, the latter method, as well as that of Chihara et al, and other prior art disclosures, has the disadvantage of instability of control, as will now be described. If we assume that the stepping motor load is increased above a predetermined level, then, with each of these prior art methods, this will be detected and a corresponding control voltage will be developed. This control voltage is used to cause a higher power drive pulse to be aplied to the stepping motor, as the next drive pulse after detection of the increased load. However, the effect of the increased power drive pulse will be to rotate the stepping motor rotor in a similar manner to that in which the rotor is rotated by a normal power drive pulse when under normal (i.e. relatively light) load. Thus, the detection means will fail to detect that an increased load is applied to the stepping motor, when detection is performed during or immediately subsequent to the increased power drive pulse, so that the next drive pulse after the increased power drive pulse will be a normal power drive pulse. It can be seen from this that a type of oscillatory instability, sometimes referred to as "hunting" is inherent in the prior art methods of controlling the drive power to an electronic timepiece stepping motor in dependence on the load applied to the motor. Because of this fundamental defect, such methods are of limited practical application for actually reducing the power consumption of electronic timepieces manufactured on a mass production basis. This is due to the fact that most of these prior art methods of detecting the load applied to the stepping motor are based on detection of a voltage (developed in the drive coil or in an auxiliary detection coil) whose value is determined by the angular velocity of the stepping motor rotor during or just after a drive pulse. When an increased power drive pulse is applied after an increased load condition has been detected, then this will result in the stepping motor rotor being accelerated to an angular velocity comparable to that which results from application of a normal power drive pulse under normal load. It is therefore extremely difficult, or impossible, for the detection circuit means to determine whether the stepping motor is operating under a condition of normal load, with a normal power drive pulse applied, or under a condition of increased load, with an increased power of drive pulse applied.

Another disadvantage is found in practice with the prior art methods in which the drive coil of the stepping motor is open-circuited for a short time just after the cessation of a drive pulse, and the level of voltage developed across the drive coil is detected. This is due to the fact that the voltage developed at this time is the sum of the electromotive force developed by the rotation of the stepping motor rotor through the magnetic field of the motor and the voltage developed by the collapse of the magnetic flux which was induced in the drive coil by the preceding pulse of drive current. It is therefore difficult to accurately predict the value of this composite voltage, and hence it is difficult to produce such detection means on a mass-production basis, without having to set-up the detection level for each individual electronic timepiece.

With the present invention, the above disadvantages of the prior art methods are eliminated. While the stepping motor is operating under normal load, detection of a voltage induced in the drive coil of the stepping motor is performed under a normal load detection status. When a load which is above a predetermined threshold level is detected in this normal load detection status, the operation then enters an increased load detection status, and an increased power drive pulse is applied as the next drive pulse to the motor. The increased load detection status is such that, so long as the increased load level applied to the stepping motor is maintained, the increased power drive pulses continue to be applied. When the load on the stepping motor falls below a predetermined level, then this is detected and the normal load detection status is then re-entered. Subsequently, normal power drive pulses are applied to the motor.

In this way, the control instability of the prior art methods is completely eliminated. In addition, with the present invention, detection of the drive coil voltage is performed only after effects induced by the drive current of the preceding drive pulse have been completely dissipated. This is ensured by performing detection of the drive coil voltage at an instant during one of several cycles of damped angular oscillation performed by the rotor of the stepping motor immediately after having been advanced by a drive pulse.

SUMMARY OF THE INVENTION

The present invention comprises an electronic timepiece having a stepping motor which is periodically driven by drive pulses to rotate through a predetermined angle and thereby advance the time information displayed by time indicating means coupled to the stepping motor. The time indicating means include means which apply a normal, relatively light load on the stepping motor, such as time indicating hands, and means which applies a relatively high load upon the stepping motor, such as a date display mechanism. Upon the completion of each drive pulse, the drive coil of the stepping motor is short-circuited. At a predetermined point during one of several cycles of damped oscillation performed by the rotor of the stepping motor after each drive pulse, the drive coil terminals are open-circuited, and the voltage developed across the coil is detected. If a normal, i.e. relatively light load has been applied to the motor up to that time, then the drive control system of the timepiece will be in a particular operating condition, referred to herein as the normal drive detection status. In this status, if the detected voltage of the drive coil is below a predetermined level, then this is interpreted as an increase in the stepping motor load above a predetermined level. As a result, the drive control system enters a second operating condition, referred to herein as the increased drive detection status, and causes the next drive pulse applied to the stepping motor to be of increased power. The detection conditions in the increased drive detection status are different from those of the normal drive detection status, such that so long as the increased load condition is maintained, the increased drive detection status is maintained, and drive pulses of increased power are applied to the stepping motor. As soon as the increased motor load is removed, this is detected by the detection circuit of the drive control system, which is thereby returned to the normal drive detection status and causes the next drive pulse applied to the stepping motor to be of normal power.

The drive pulses may consist of single pulses, or of pulse bursts. In the case of single drive pulses, the power delivered to the stepping motor by each drive pulse can be controlled by varying the duration of each drive pulse. In the case of drive pulse bursts, the power delivered to the stepping motor by each drive pulse burst can be controlled by varying the duty cycle of the high frequency pulses constituting a drive pulse burst.

With the present invention, as will be explained in the description of the second preferred embodiment, it is also possible to automatically adjust the timing at which the drive coil voltage is sampled (i.e. at which the voltage is detected) in such a way as to eliminate unwanted effects caused by variations between the characteristics of different stepping motors. This is done by means of a phase control system which automatically adjusts the timing of drive coil sampling to a suitable value when power is first applied to the timepiece circuit. Thereafter, this value of sampling timing is maintained constant. This capability is extremely important, for providing a drive control system in an electronic timepiece which is suitable for mass-production manufacturing methods, in which it is uneconomic to adjust the operation of each individual drive control circuit in order to compensate for the effects of manufacturing tolerance variations in the stepping motor characteristics.

BRIEF DESCRIPTION OF THE DRAWINGS

In the appended drawings:

FIG. 5 is a block circuit diagram of a first embodiment of an electronic timepiece according to the present invention, in which the detection status of the drive control system is varied by varying the timing at which coil voltage detection is performed, with respect to the end of a drive pulse;

DESCRIPTION OF THE PREFERRED EMBODIMENTS

Figure 1:
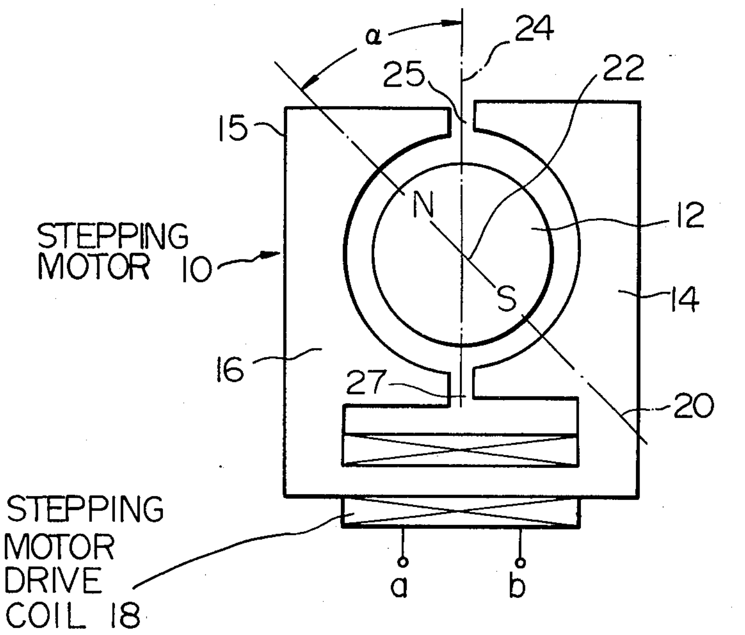
Fig. 1 PRIOR ART
FIG. 1 is a simplified cross-sectional view illustrating the configuration of a typical stepping motor used in an electronic timepiece.

Referring now to FIG. 1, a simplified cross-sectional view of a typical stepping motor as used in in electronic timepiece is shown. This stepping motor, denoted by reference numeral 10, is composed of a stator 15 having two stator pole pieces 14 and 16, which carries a stepping motor drive coil 18. A rotor 12 has North and South magnetic poles designated as N and S, which lie along a magnetic axis 22. The stator pole pieces 14 and 16 are arranged such that the magnetic axis 22 of the rotor is the axis of static equilibrium, i.e. the rotor will come to rest at the position shown with respect to the stator. This axis of static equilibrium is set at an angle $\alpha$ with respect to the line 24 between the gaps of the stator. The terminals by which connection is made to the stepping motor drive coil 18 are designated as "a" and "b" respectively.

Figure 2:
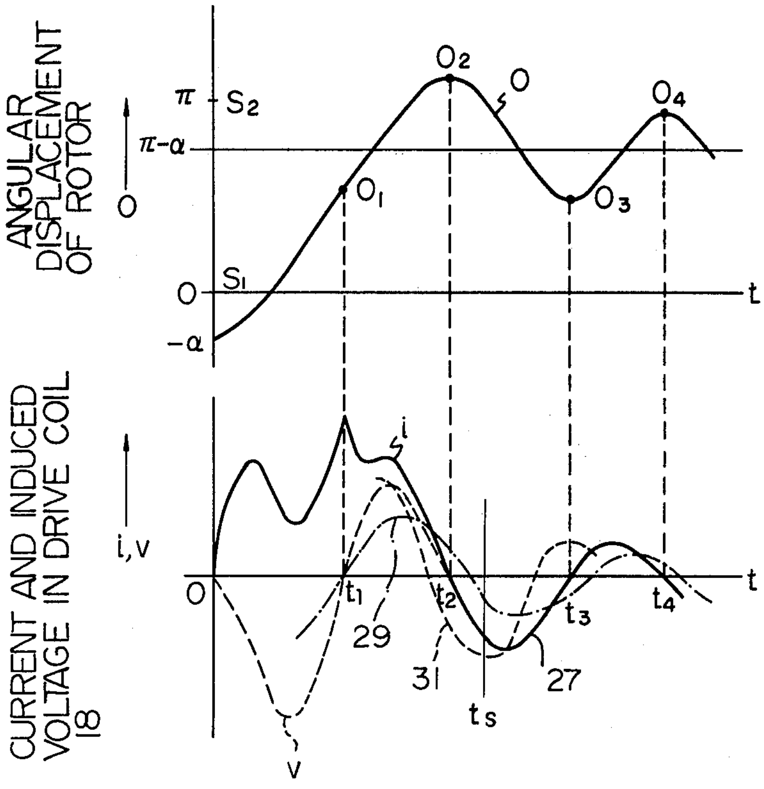
Fig. 2 PRIOR ART
FIG. 2 comprises graphs which illustrate the relation between the angular position of the rotor of a timepiece stepping motor and the current and voltage developed in the drive coil of the motor.

FIG. 2 is a waveform diagram illustrating the relationship between the current which flows in stepping motor drive coil 18 when a drive pulse is applied to terminals a and b, the current which flows in the stepping motor drive coil 18 during and immediately after the drive pulse (assuming that a short circuit condition is established between terminals a and b immediately after the drive pulse occurs), the voltage which is induced in the stepping motor drive coil 18 as a result of angular rotation due to the drive pulse, and the corresponding angular motion of the rotor 22. In FIG. 2, it is assumed that a drive pulse (which in this instance is a continuous, single pulse) is applied between terminals a and b of stepping motor drive coil 18 during time period 0 to t1 in FIG. 2. In the angular motion diagram at the top of FIG. 2, angular position 0 corresponds to the position of rotor 12 at which the north pole of the rotor is aligned at the upper gap 25 of the stator, while the south ple is situated opposite the lower gap 27. In the initial equilibrium position, the rotor is in position—$\alpha$, therefore, and moves to angular position 0 after the drive pulse has been applied, since clockwise rotation of the rotor is assumed. The rotor continues to move, and reaches an angle $\theta 1$ when the drive pulse terminates at time t1. The rotor continues its rotation, and reaches its second position of static equilibrium after rotating through 180°, this angular position being indicated as $\theta 2$ in FIG. 2. At this point, the south pole of the rotor has reached the position occupied by the north pole in FIG. 1. The rotor then overshoots this position of static equilibrium, and thereafter performs several cycles of damped angular oscillation, attaining peak angles of displacement indicated as $\theta 3$ and $\theta 4$ in FIG. 2.

The lower diagram of FIG. 2 shows the current flowing in stepping motor drive coil 18 during and immediately after a drive pulse, and the voltage which is developed in the drive coil 18 due to rotation of the rotor in response to the drive pulse. During time 0 to t1, the drive pulse current flows, and thereafter a short-circuit is established between terminals a and b of stepping motor drive coil 18, so that a current flows during the time interval t1 to t2, having the waveform shown. This current aids in driving the stepping motor rotor in the forward (i.e. clockwise) direction, thereby increasing the efficiency of operation of the motor. During the time interval t1 to t2, the energy which has been stored in the drive coil 18 as magnetic flux, due to the preceding drive pulse, is being dissipated. If the stepping motor drive coil 18 terminals a and b were to be open-circuited during this time interval, and the voltage developed thereby were measured in order to detect the load placed on the motor, the voltage actually measured would be the sum of two components. One component would be due to the collapse of magnetic flux due to the preceding drive current pulse. The other component would be due to the voltage induced in stepping motor drive coil 18 by rotation of rotor 12. It is therefore difficult to utilize a voltage detected during time t1 to t2 to detect the load on the stepping motor in a reliable fashion. A much more reliable method of detecting the level of load on the motor, which is used in the present invention, is to open-circuit the terminals a and b of stepping motor drive coil 18 for a short time during one of the time intervals t2 to t3, or t3 to t4, when the rotor of the stepping motor is performing angular oscillations in a manner which is determined almost entirely by the load torque being applied to the motor, so that the detected coil voltage will be almost completely independent of the amplitude of current which has flowed in the drive coil as a result of the preceding drive pulse. Sampling of the voltage developed in the stepping motor drive coil 18 can for example be performed at time ts, as shown in the lower graph of FIG. 2. In the latter graph, the voltage developed in the drive coil due to motion of the rotor 22 in response to a normal power drive pulse, while a normal load level is applied to the stepping motor, is designated by reference numeral 27. The voltage developed in stepping motor drive coil 18 after application of a normal power drive pulse, when an increased load is applied to the stepping motor, is indicated by numeral 29. The voltage developed in stepping motor drive coil 18 following the application of an increased power drive pulse is indicated by numeral 31. (For simplicity of description, it is assumed here that an increased power drive pulse has the same duration as a normal power drive pulse). Curves 27, 29 and 31 are intended to approximately represent the relationships between the voltages developed across drive coil 18 terminals a and b when these terminals are briefly converted from a short-circuit state to an open-circuit state. It can be seen that, if a detection threshold voltage were to be selected having a value intermediate between the value of curve 27 and the value of curve 29 at time is, then it is possible to detect a change from a normal load condition of the stepping motor to an increased load condition. Steps can then be taken to increase the power of the next drive pulse applied to the stepping motor drive coil 18, so that after that increased power drive pulse, a voltage whose value is that of curve 31 at time ts will be applied to the detection means. It can be seen that the detection means will thereby detect a voltage which is above the threshold level, and will therefore cause a normal power drive pulse to be applied as the next pulse to the stepping motor drive coil 18. This would obviously be an unsatisfactory method of controlling the drive power applied to the stepping motor.

With the present invention, this disadvantage is overcome by performing detection of the drive coil voltage under one of two different detection statuses. The current detection status is determined in accordance with whether or not an increased load condition was previously detected. Changing of the detection status can be performed either by altering the timing at which sampling of the coil voltage is performed, or by altering the threshold voltage at which detection is performed. For example, let us assume that in the detection status corresponding to a normal load condition on the stepping motor, which will be referred to as the normal load detection status, detection is performed by sampling the output voltage from drive coil 18 at time ts shown in FIG. 2, and at a threshold voltage of Vt. When an increased drive pulse is applied to the stepping motor, then it is necessary to change the detection status such that the detection circuit will react to the sampled voltage, after application of the increased drive pulse, in the same way as it reacts after application of a normal power drive pulse under a normal load condition. This can be ensured by changing the timing of the detection from time ts, so that the level of detected voltage from drive coil 18 (curve 31 in FIG. 2) will be below the threshold level Vt. Alternatively, the detection timing ts can be kept constant, and the threshold voltage for detection can be changed to a new value, Vt', such that the detected voltage after an increased power drive pulse, with increased load on the stepping motor (curve 31) will be below the new threshold level. In either of the above cases, i.e. with a change in detection timing or a change in detection threshold level, the new detection status thereby established will be referred to hereinafter as the increased drive detection status.

In the first two embodiments described hereinafter, the detection status is changed by changing the detection timing. In the third embodiment, the detection status is changed by changing the detection threshold level.

Figure 3:
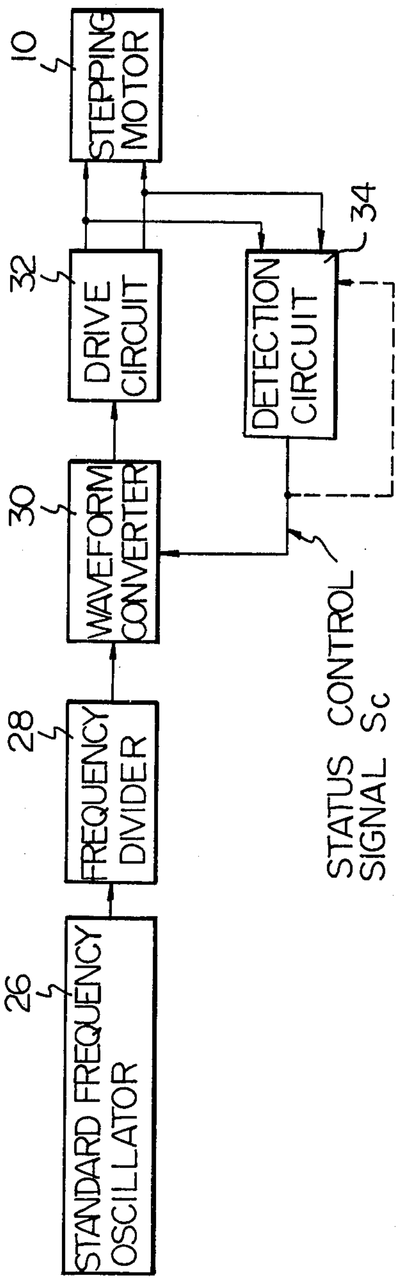
FIG. 3 is a simplified block diagram illustrating the fundamental features of an electronic timepiece according to the present invention.

Referring now to FIG. 3, a general block diagram applicable to all of the following embodiments of the present invention is shown. A standard frequency oscillator circuit 26 produces a standard frequency timebase signal which is applied to a frequency divider 28. Frequency divider 28 thereby produces a standard time signal which is applied to a waveform converter 30. In response to the standard time signal, waveform converter 30 produces a drive signal, which is applied to stepping motor drive coil 18 of stepping motor 10. Waveform converter 30 also produces an interruption signal which establishes an open-circuit condition between terminals a and b of stepping motor drive coil 18, for a short time interval, during which the output voltage developed by stepping motor drive coil 18 is detected. If the detected voltage is above a predetermined threshold, then subsequent operation is unchanged. If the detected voltage is below the detection threshold, then the detection status is changed, and the next drive pulse delivered by drive circuit 32 is made of increased power (if an increase in load torque has been detected) or of normal power (if a return to a normal torque load on the drive motor 10 has been detected).

The changeover of detection status is controlled by means of a status control signal Sc produced by detection circuit 34. The status control signal Sc either controls the timing at which detection of stepping motor drive coil 18 voltage is performed, or controls the threshold voltage at which detection circuit 34 operates, as indicated by the broken line in FIG. 2.

Figure 4:
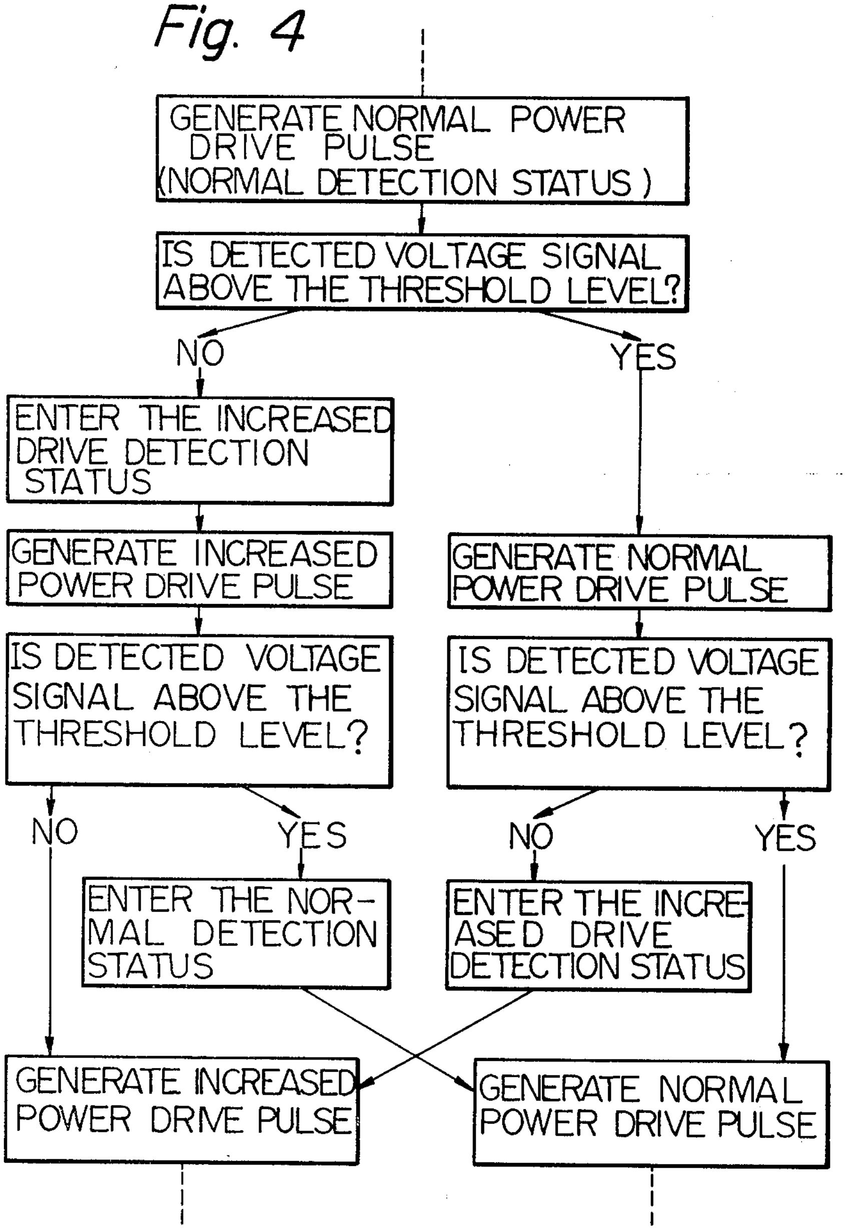
FIG. 4 is a flow chart illustrating the relationship between the operation of the drive control system of a timepiece according to the present invention and variations in the load torque applied to the stepping motor.

FIG. 4 is a flow diagram which illustrates the general principles of operation of a drive control system according to the present invention. In FIG. 4, an initial condition of normal detection status is assumed. As can be seen the detection circuit 34 determines whether to changeover the detection status, to the normal drive detection status or the increased drive detection status, in accordance with the result of detection in the current status. This ensures immediate, yet highly accurate, detection of a change in load on the stepping motor 10, and control of the drive power applied to the stepping motor.

Referring now to FIG. 5, a first embodiment of the present invention will be described. FIG. 5 is a general block circuit diagram of an electronic timepiece having a drive control system in accordance with the present invention. A standard frequency timebase signal from a standard frequency oscillator 26 is supplied to a frequency divider circuit 28, which produces a standard time signal having a period of one second. This standard time signal is applied to a normal drive input signal generating circuit 46, an increased drive input signal generating circuit 48, a sampling signal generating circuit 50, an interruption signal generating circuit 52, a status set signal generating circuit 54, and a status reset signal generating circuit 55. A normal drive input signal consisting of pulse trains 1 and 2 is produced by normal drive input signal generating circuit 46. Signal $\phi 1$ and $\phi 2$ each consist of pulses of duration 3.9 milliseconds, with a period of 2 seconds between each pulse. Signals $\phi 3$ and $\phi 4$ each consist of pulses of 5.9 milliseconds duration, with a period of 2 seconds between each pulse. A selector circuit 56 selects either signals $\phi 1$ and $\phi 2$, or signals $\phi 3$ and $\phi 4$, as drive input signals to be applied to a drive circuit 32. A drive signal is thereby applied to a stepping motor drive coil 18, with the drive signal being of normal power when the drive input signal $\phi 1$ and $\phi 2$ is applied from normal drive input signal generating circuit 46, and being of increased power (i.e. of increased duration) when the drive input signal $\phi 3$ and $\phi 4$ is applied from increased drive input signal generating circuit 48. Drive circuit 32 is composed of two P-channel MOS field effect transistors 64 and 66, and two N-channel MOS field-effect transistors 68 and 70. The drive input signal from the output of selector circuit 56, designated as P1, is applied to the gate of MOS transistor 66, and also to an input of an AND gate 60. The drive input signal from the output of selector circuit 58, designated as P2, is applied to the gate of MOS transistor 64, and also to an input of an AND gate 62. One output signal from interruption signal generating circuit 52 is applied to the other input of AND gate 60, and is designated as 01. The other output signal from interruption signal generating circuit 52, designated as 02, is applied to the other input of AND gate 62. The output of AND gate 60 is applied to the gate of MOS transistor 70, while that of AND gate 62 is applied to the input of MOS transistor 68. The output signal from drive circuit 32 is applied to one terminal, designated as terminal a, of stepping motor drive coil 18, from the junction of the drain electrodes of MOS transistors 66 and 70. The drive signal is also applied to the other terminal, b, of stepping motor drive coil 18, from the junction of MOS transistors 64 and 68 of drive circuit 32.

The inputs of two inverters, 72 and 74, are connected to terminals b and a of stepping motor drive coil 18, respectively. The electrical characteristics of these inverters 72 and 74 determine the detection threshold level, i.e. the level of voltage on terminal a or b of stepping motor drive coil 18 at which the output of inverter 72 or 74 changes from one logic level potential to the other. The output signals from inverters 72 and 74 are applied to two inverters 76 and 78 respectively. Inverters 72, 74, 76 and 78 form the input section of a detection circuit 34, which is also composed of a selector circuit 80, set/reset flip-flops 82 and 86, and an AND gate 84. Selector circuit 80 of detection circuit 34 is controlled by signals S1 and S2 produced by sampling signal generating circuit 50. The output of selector circuit 80 is applied to the reset terminal of flip-flop (abbreviated hereinafter to FF) 82. A set signal S3 produced by status set signal generating circuit 54 is applied to the set terminal of FF 82. The output of FF 82 is applied to one input and AND gate 84, while a reset signal R is applied to the other input from status reset signal generating circuit 55. The output of AND gate 84 is connected to the reset terminal of FF 86, while a set signal S4 is connected to the set terminal of FF 86, from status set signal generating circuit 54. An output signal thereby produce by detection circuit 34, called the status control signal Sc, controls the operation of the increased drive input signal generating circuit 48, the sampling signal generating circuit 50, the interruption signal generating circuit 52, the status set signal generating circuit 54, the status reset signal generating circuit 55 and selector circuits 56 and 58, as will now be described with reference to the waveform diagram of FIG. 6.

Figure 6:
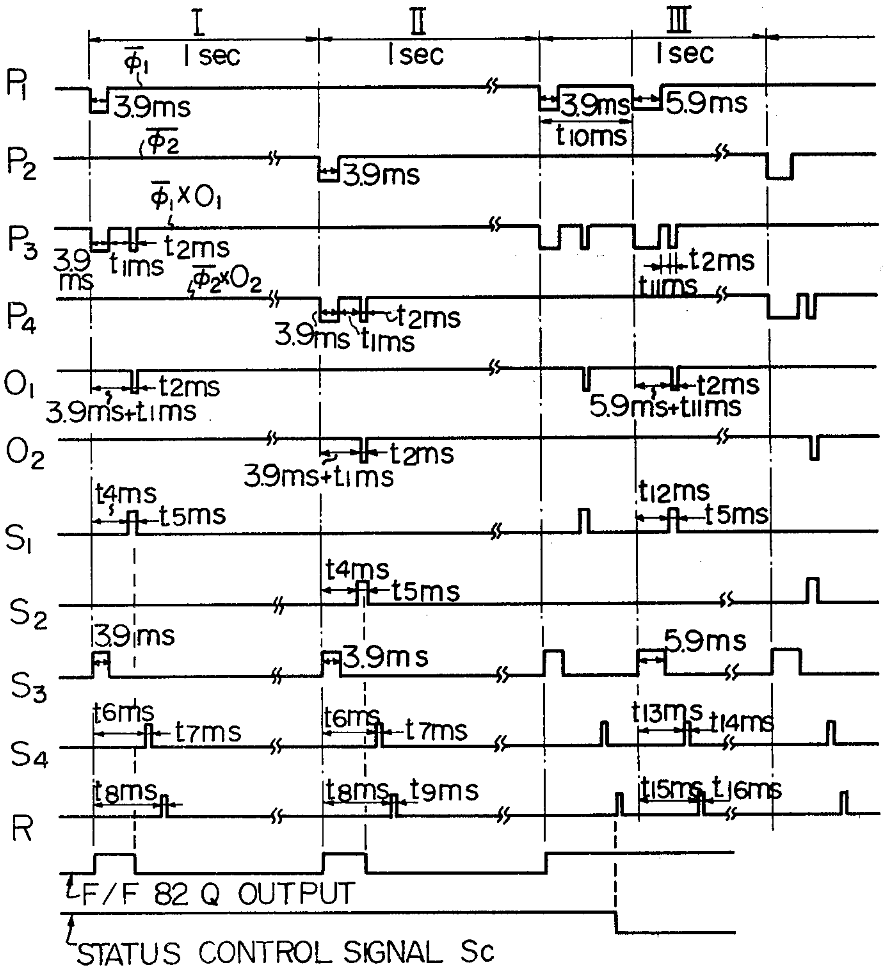
FIG. 6 is a waveform diagram illustrating the operation of the timepiece circuit of FIG. 9.

In FIG. 6, three succesive one-second intervals of operation of the circuit of FIG. 5 are designated as interval I, interval II and interval III respectively. At the start of interval I, signal $\phi 1$ from normal drive input signal generating circuit 46 causes signal P1 to go to the low logic level for 3.9 milliseconds. As a result, MOS transistor 66 is changed from the cut-off to the conducting condition. At the same time, signal P3 from AND gate 60 goes to the low logic level potential (referred to hereinafter as the L logic level) for 3.9 milliseconds. N-channel MOS transistor 70 is thereby placed in the non-conducting condition while transistor 66 is in the conducting condition. At this time, transistors 64 and 68 are in the non-conducting and conducting conditions, respectively, so that a drive current flows in stepping motor drive coil 18, from terminal a to terminal b. Subsequently, at the start of interval II, a similar process occurs as a result of signal P2 produced by selector circuit 58 in response to signal $\phi 2$ from normal drive input signal generating circuit 46.

After a time interval of t1 milliseconds (abbreviated hereinafter to ms) following the end of the $\phi 1$ pulse which begins interval I, a pulse of signal 01, from interruption signal generating circuit 52, is applied to AND gate 60, causing its output to go to the H logic level. During the time t1, and after the end of the 01 pulse, a short-circuit condition is, in effect, established between terminals a and b of stepping motor drive coil 18, since both of MOS transistors 68 and 70 are in the conducting condition at that time. However the interruption signal 01 causes transistor 70 to temporarily enter the non-conducting condition, and during this time, which has a duration designated as t2 ms, detection of the drive coil voltage is performed. This is done by means of sampling signal S1, which beings after time t4 ms following the start of the previous drive pulse, and has a duration of t5 ms. If the voltage developed at terminal a of drive coil 18 is above the threshold voltage of inverter 74 during a sampling interval defined by the duration of a sampling signal pulse, then the output of inverter 74 will to from the H to the L logic level. (The drive coil output voltage durin a sampling interval will be referred to as the detection signal.) The output of inverter 78 will therefore go to the H logic level. This output, in conjunction with the sampling pulse S1 applied to selector circuit 80 of detection circuit 34 causes the output of selector circuit 80 to go to the H logic level. Previously, FF 82 has been set by the set signal S3 from status set signal generating circuit 54. FF 82 is then reset by the output from selector circuit 80, so that the output of FF 82 goes to the L level. A reset pulse R is then applied to an input of AND gate 84 from status reset signal generating circuit 55, however since AND gate 84 is inhibited by the output from FF 82, the output of AND gate 84 remains at the L level, and no reset signal is applied to FF 86. The output of FF 86 (status control signal Sc) therefore remains at the H level, since FF 86 has been previously set by a set signal S4 from status set signal generating circuit 54.

Subsequently, during interval II, a similar process occurs since it is assumed that, as in the case of interval I, the load torque applied to the stepping motor is at the normal level, so that the detection voltage applied to inverter 72 of detection circuit 34 is above the threshold level.

During interval III, the load torque on the stepping motor is above a predetermined level, due to the application of a heavy load such as a date display mechanism. A drive pulse of 3.9 ms is again applied to drive coil 18 at the start of interval III, and the voltage developed in stepping motor drive coil 18 is subsequently detected by means of interruption signal pulse 01 and sampling signal pulse S1, as described previously for interval I. During the sampling interval, the voltage at the input of inverter 74 remains below the detection threshold level, so that the output of inverter 78 remains at the L logic level. Prior to the sampling interval, i.e. prior to the sampling signal pulse S1, FF 82 has been set by set pulse S3. Since the output of selector circuit 80 remains at the L logic level during the sampling interval in this case, FF 82 is not reset, and its output remains at the H logic level. Thus, when a reset pulse R is applied to AND gate 84, the output of AND gate 84 goes to the H logic level, thereby resetting FF 86. Status control signal Sc therefore goes to the L logic level, and remains at that level until the next set signal pulse S4 is applied to FF 86.

In response to the change of status control signal Sc from the H to the L logic level, a pulse of 5.9 ms duration is output, as signal $\phi 3$, from increased drive input signal generating circuit 46. This drive input signal pulse causes the output of selector circuit 56 to go the the L logic level for 5.9 ms, since at this time the output of inverter 57 is at the H logic level, due to the L logic level condition of status control signal Sc.

The reason for generating a 5.9 ms drive input signal P1 at the transition from H level to L level of the status control signal Sc will now be explained. It is possible that the increased load torque applied to the rotor of the stepping motor will be sufficiently high that the rotor fails to be rotated fully through 180°, and returns to its previous position of static equilibrium after the drive pulse at the beginning of interval III. In this case, the 5.9 ms drive pulse, i.e. the increased power drive pulse, which is subsequently applied during period III, will cause the rotor to advance fully to the next position of static equilibrium. However, if the rotor is in fact fully advanced by the 3.9 ms drive pulse at the beginning of interval III, then the timing of the 5.9 ms increased power drive pulse in interval III is such that the rotor will not be advanced by the 5.9 ms pulse. This is ensured by arranging the timing of the 5.9 ms drive pulse in interval III such that, if the rotor has in fact been rotated fully by the preceding normal power drive pulse (i.e. the 3.9 ms pulse at the start of interval III), then the direction of current flowing through the stepping motor drive coil 18 at the start of the 5.9 ms increased power drive pulse will be in opposition to the current induced by that drive pulse. As a result, the 5.9 ms increased power drive pulse will be ineffective in advancing the rotor. Thus, it is ensured that the stepping motor will be advanced only once during interval III, irrespective of whether the advancement is performed by the normal power drive pulse of 3.9 ms or the increased power drive pulse of 5.9 ms.

At the start of the next one-second interval after interval III, i.e. interval IV, a pulse of 5.9 ms duration is produced as drive input signal $\phi$4, by increased drive input signal generating circuit 48. Since status control signal Sc is still at the H logic level at this time, a 5.9 ms L logic level output is produced as signal P2 from selector circuit 58, so that an increased power drive pulse of 5.9 ms duration is applied to stepping motor drive coil 18 at the start of interval IV.

While the status control signal Sc is at the H logic level, the electronic timepiece of the first embodiment is operating in the normal detection status. In this detection status, each of the interruption signal pulses 01 and 02 is produced at a timing of (3.9 ms+t1) after the start of a 3.9 ms normal power drive pulse, and each pulse of the sampling signal, S1 and S2, is produced at a timing of t4 ms after the start of the preceding normal power drive pulse. When an increased load on the stepping motor is detected, and status control signal Sc thereby goes to the L logic level, then the timepiece commences operation in the increased drive detection status. In this status, each of the interruption signal pulses 01 and 02 is produced at a timing of (5.9 ms+t11) after the start of an increased power drive pulse, and each pulse of the sampling signal, S1 and S2, is produced at a timing of t12 ms after the start of an increased power drive pulse. The timing relationships in the normal detection status and the increased drive detection status will now be described, with reference to FIG. 7 and FIG. 8.

Figure 7:
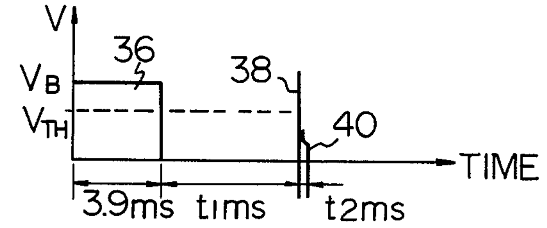
FIG. 7 is a simplified waveform diagram illustrating typical relationships between a drive pulse and a subsequent detection voltage, when normal power drive pulses are applied.

FIG. 7 shows the voltages appearing across the drive coil terminals a and b during and just after a normal power drive pulse application. Numeral 36 denotes the drive pulse voltage, the level of which, designated as $V_B$, is slightly less than the voltage of the timepiece battery. The drive pulse continues for 3.9 ms, after which the drive coil 18 terminals are short-circuited as described hereinabove. After a time interval of t1 ms, an interruption signal pulse 01 or 02 is generated, causing the drive coil to be externally open-circuited between terminals a and b, so that the current flow through the drive coil is interrupted. As a result, a voltage pulse is generated across the drive coil terminals, which will generally speaking have the form of a spike voltage. The amplitude of this voltage pulse will depend upon the amplitude of current flowing in drive coil 18 when the interruption pulse is applied, and will vary in accordance with timing of the interruption pulse in a manner indicated by curves 27, 29 and 31 in FIG. 2. Numeral 38 indicates the general form of the drive coil voltage pulse in the case of a normal load being applied to the stepping motor. The threshold voltage of the detection circuit 34 (i.e. of inverter 72 or 74) is denoted as $V_{TH}$. Numeral 40 denotes the drive coil voltage pulse, at the time of interruption, when a heavy load is being applied to the stepping motor, with a normal power drive pulse of 3.9 ms. It can be seen that the peak value of pulse 38 is above the threshold level $V_{TH}$, while that of the pulse 40 is below the threshold level. The duration of time interval t1 is selected such that interruption of the drive coil current begins at a time point such as $t_s$ shown in FIG. 2, i.e. while the stepping motor rotor has overshot the position of static equilibrium and is performing damped angular oscillations.

Figure 8:
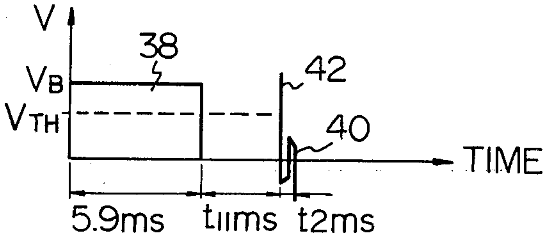
FIG. 8 is a simplified waveform diagram illustrating the relationship between a drive pulse and a subsequent detection signal voltage, when increased power drive pulses are applied.

Referring now to FIG. 8, a similar diagram to that of FIG. 7 is shown for the case of the increased drive detection status, i.e. when increased power drive pulses of 5.9 ms duration are applied to the stepping motor drive coil 18. Numeral 38 indicates the drive voltage pulse. After a time of t11 ms following the end of a 5.9 ms drive pulse, an interruption signal pulse 01 or 02 is generated, thereby interrupting the flow of current through the drive coil 18. As explained previously with respect to FIG. 2, the timing at which detection of the drive coil 18 voltage is performed (determined by the duration of time interval t11) is arranged such that the output voltage pulse from drive coil 18 when a heavy load torque is applied to the stepping motor with increased drive power (indicated by numeral 40 in FIG. 8) is below the threshold voltage detection level, i.e. below $V_{TH}$. So long as this condition is continued, the status control signal remains at the logic level (the L level) which maintains the operation of the timepiece in the increased load detection status.

When the load torque on the stepping motor is returned to the normal level, then the current flowing in drive coil 18 at the time of interruption, i.e. after time t11, is substantially increased over the level during increased load operation. The amplitude of the voltage pulse produced by drive coil 18 at the time of interruption, indicated by numeral 42 in FIG. 8, is therefore above the threshold level $V_{TH}$ of detection circuit 34. As a result, FF 82 in detection circuit 34 is reset by the output from selector circuit 80, so that status control signal Sc returns to the H logic level. The timepiece is thus now operating in the normal detection status, and the next drive pulse applied to drive coil 18 will be at the normal power level, i.e will have a duration of 3.9 ms.

Figure 9:
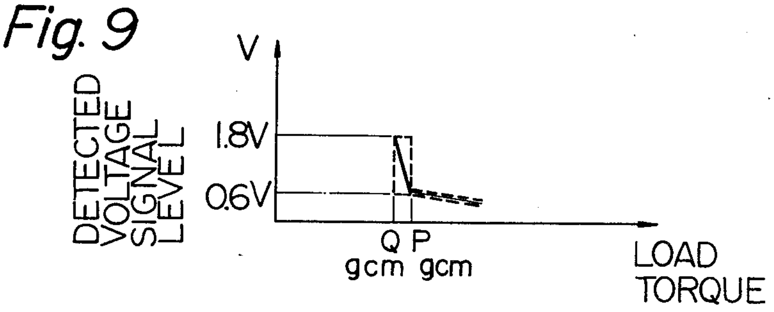
FIG. 9 is a graph illustrating a typical relationship between detected voltage signal level and the load torque applied to the stepping motor of an electronic timepiece according to the present invention.

The relationship between the amplitude of the voltage pulse produced by drive coil 18 upon interruption of the current flow and the load applied to the stepping motor is illustrated in FIG. 9. Typical values for the drive coil voltage pulse of 1.8 V at a normal level of load torque, designated as Q gram-cm, and 0.6 V at a high load torque designated as P gram-cm are shown. It can be seen that selecting a level of threshold voltage $V_{TH}$ approximately mid-way between the 1.8 and 0.6 voltage levels will enable reliable detection of a change in load torque between Q gram-cm and P gram-cm.

Figure 10:
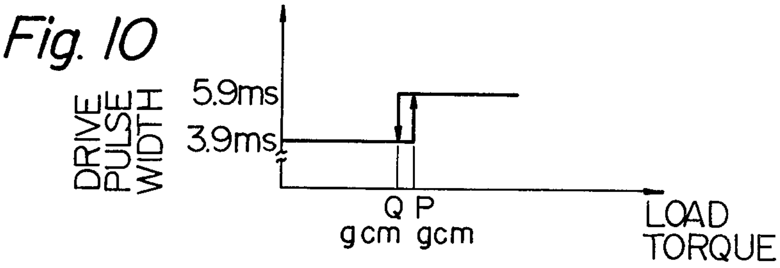
FIG. 10 is a graph illustrating the relationship between drive pulse width and load torque applied to the stepping motor of an electronic timepiece according to the present invention, for a case in which the power delivered by the drive pulses to the stepping motor is controlled by varying the pulse width of the drive pulses.

FIG. 10 indicates the relationship between drive pulse width and load torque, for the embodiment of FIG. 5. This diagram clearly illustrates the manner in which the method of the present invention, whereby different detection statuses are adopted for an increased drive condition and a normal drive condition, enables effective control. It can be seen that, if the timepiece is operating in the normal load condition, with a load torque of Q gram-cm and with normal power drive pulses applied, then a predetermined increase in load torque, from Q gram-cm to P gram-cm is necessary before a transition to the increased drive power condition occurs. In this condition, i.e. in the increased drive detection status, it is necessary for the load torque to decrease by a predetermined amount, i.e. from P gram-cm to Q gram-cm, before a transition to the normal drive power condition takes place. Such a "hysteresis" type of characteristic ensures stable and reliable control, since slight variations in the load torque will haave no undesired effects upon the operation. However, when a change in load torque below or above the predetermined levels occurs, immediate response is assured.

Figure 11:
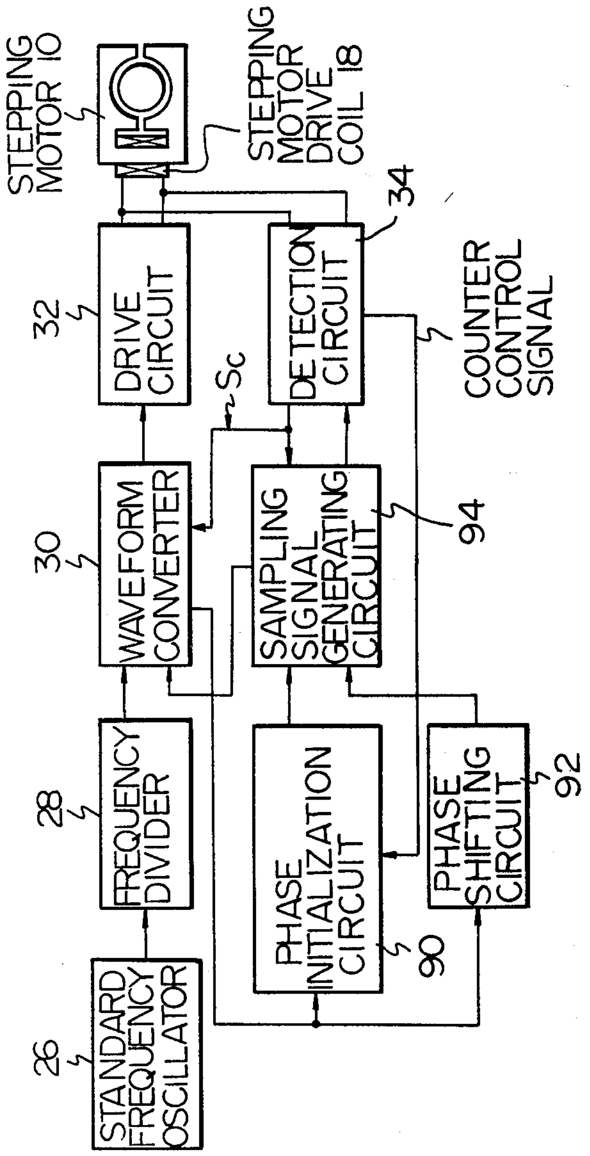
FIG. 11 is a block circuit diagram of a second embodiment of the present invention, in which changeover of the detection status of the drive control system is performed by changing the timing at which detection of the drive coil voltage is performed, and in which compensation for stray variations in the detected drive coil voltage is performed by automatic adjustment of the timing at which coil voltage detection takes place.

Referring now to FIG. 11, a second embodiment of the present invention is shown in block diagram form. A timebase signal produced by a standard frequency oscillator 26 is applied to a frequency divider circuit 28, which produces a standard time signal. This is applied to a waveform converter circuit 30, which produces drive input pulses and interruption signal pulses, as in the case of the first embodiment. These are applied to a drive circuit 32, which applies drive signal pulses to a stepping motor drive coil 18 of a stepping motor 10. Shortly after a drive pulse, the stepping motor coil 18 voltage is sampled by a detection circuit 34, and the logic level of a counter control signal and a status control signal Sc from detection circuit 34 are determined in accordance with the drive coil 18 voltage. The status control signal is used to control the production of normal drive power or increased drive power pulses from drive circuit 32, in a similar manner to that described for the first embodiment. The counter control signal controls the setting of a count value in a phase initialization circuit 90. The output signal from phase initialization circuit 90, which is determined by the count value therein, is used in conjunction with output signals from a phase shifting circuit 92, to control the precise timing at which sampling of the drive coil 18 voltage is performed, in either the normal detection status or the increased drive detection status.

Figure 12A:
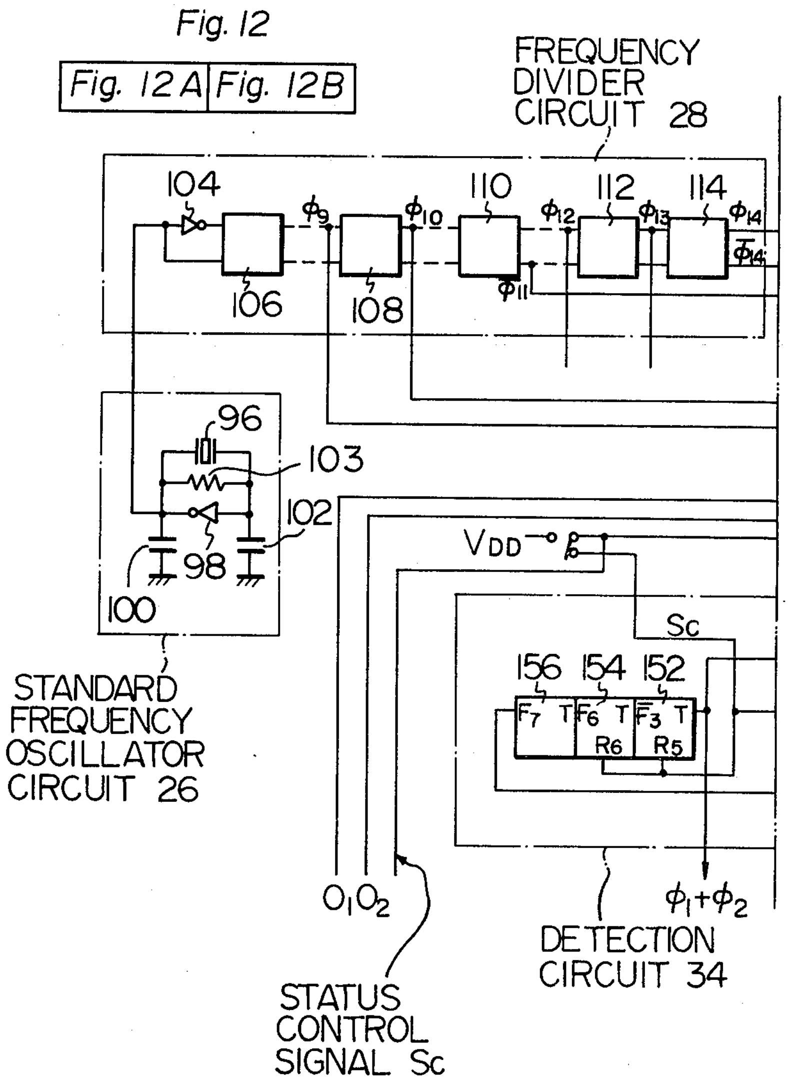
FIGS. 12A and 12B are circuit diagrams illustrating a part of the embodiment of FIG. 11 in greater detail.
Figure 12B:
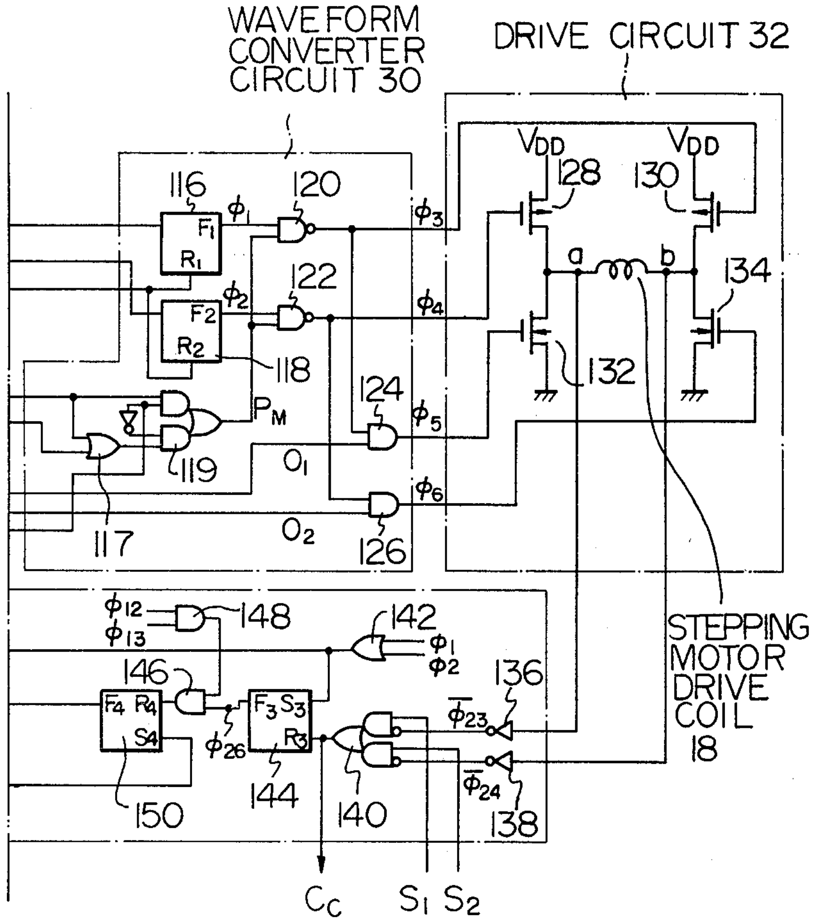
Figure 13A:
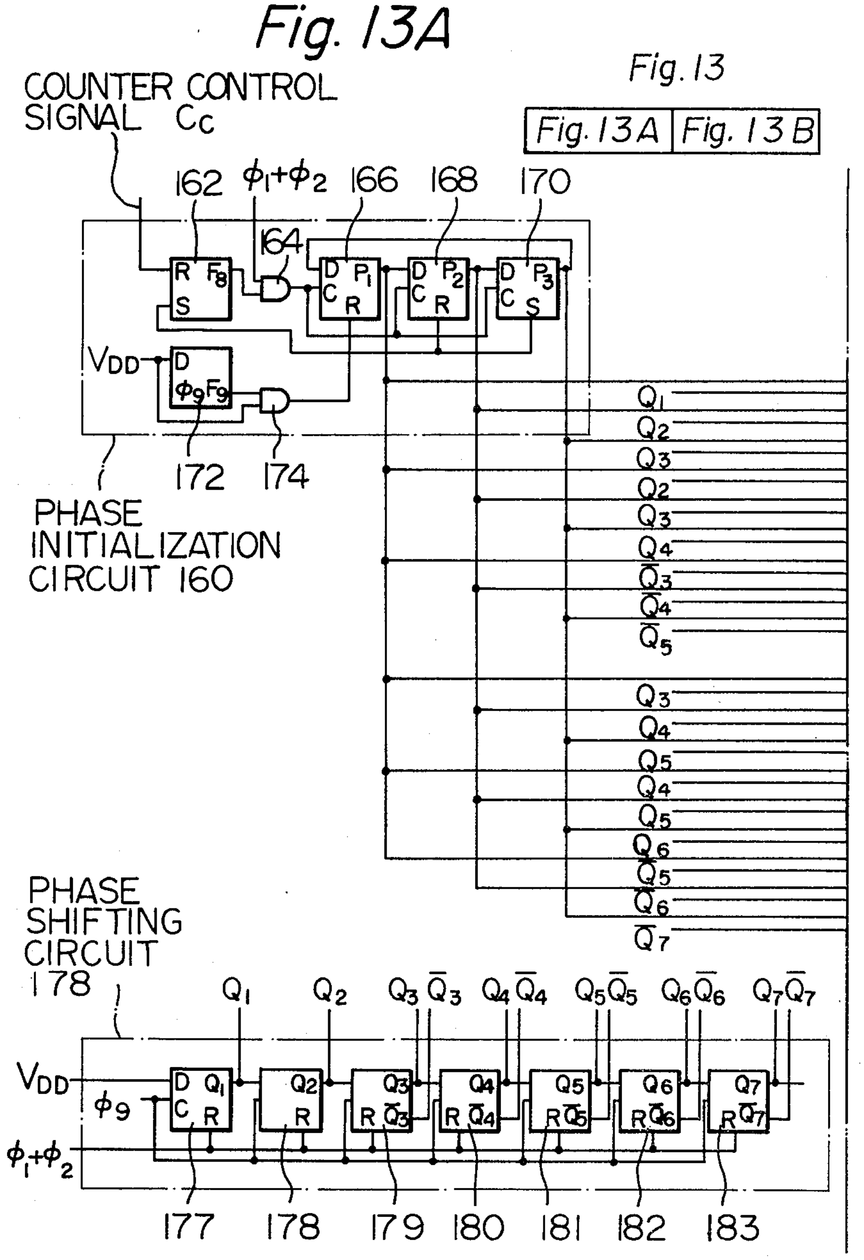
FIGS. 13A and 13B are circuit diagrams illustrating the remaining portions of the embodiment of FIG. 11.
Figure 13B:
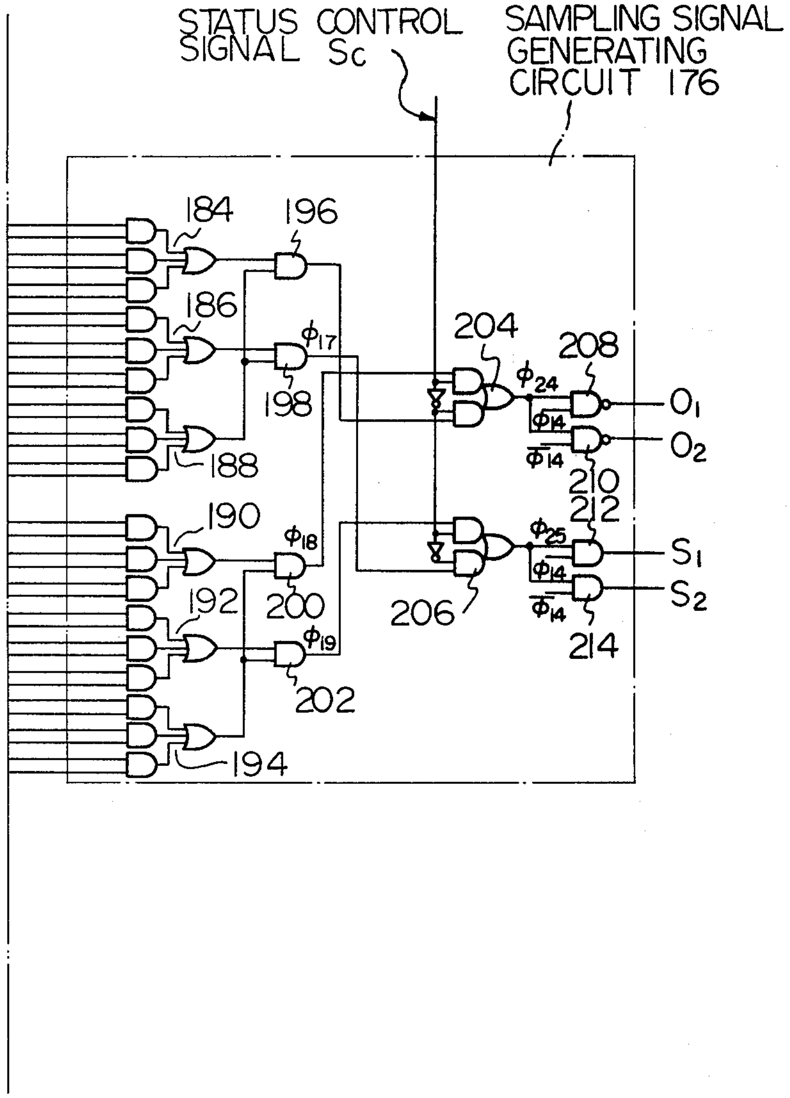
Figure 14:
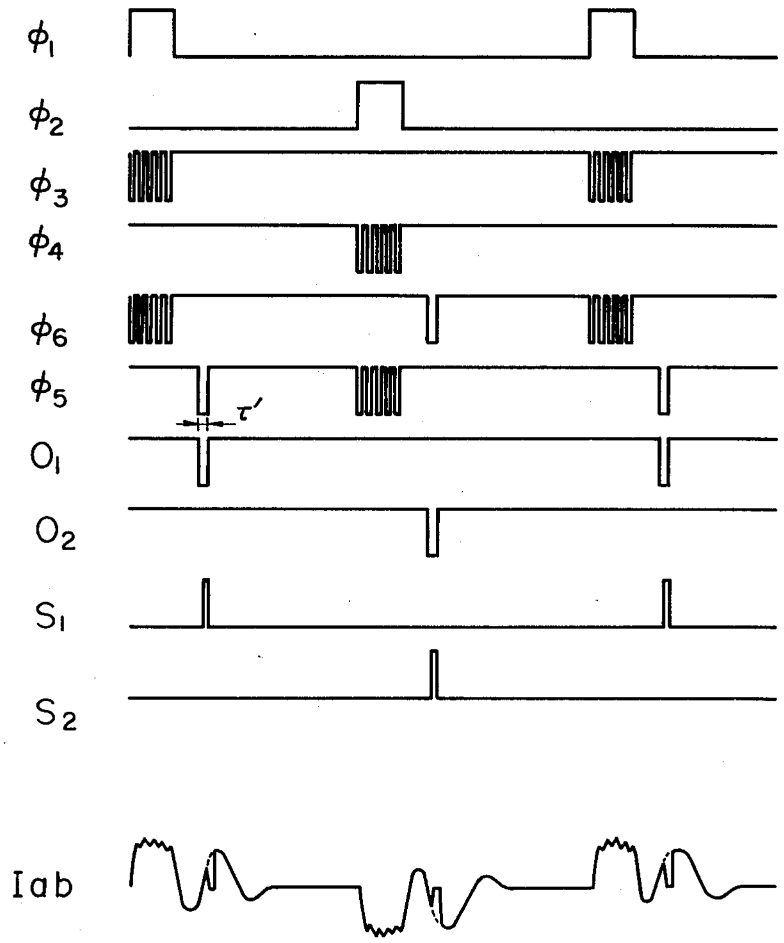
FIG. 14, FIG. 15, and FIG. 16 are waveform diagrams illustrating the operation of the second embodiment.
Figure 15:
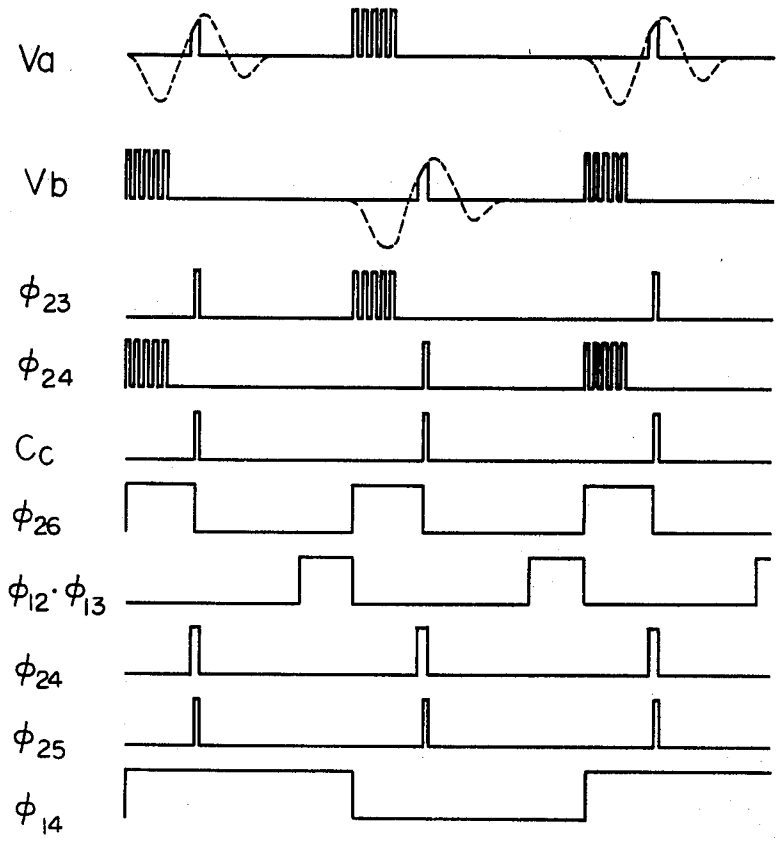

Referring now to FIG. 12 and FIG. 13, a more detailed circuit diagram of the second embodiment is shown. The standard frequency oscillator circuit is composed of a quartz crystal vibrator 96, an inverting amplifier 98, and capacitors 100 and 102, with a feedback resistor 103. A timebase signal produced by oscillator circuit 26 is input to frequency divider circuit 28, which is composed of cascaded flip-flops 106 to 114. Unit time signals $\phi 14$ and $\overline{\phi 14}$ are applied from frequency divider 28 to a waveform converter circuit 30, together with high-frequency clock signals $\phi 9$ and $\phi 10$ from the input and output of FF 108 of frequency divider 28. Drive input signals $\phi 3$, $\phi 4$, $\phi 5$ and $\phi 6$ are applied from waveform converter circuit 30 to drive circuit 32, which is composed of P-channel transistors 128 and 130, and N-channel transistors 132 and 134.

Detection circuit 34 is composed of a selector circuit 140, set/reset flip-flop 144, OR gate 142, AND gates 146 and 148, set/reset flip-flop 150, and a counter circuit composed of three cascaded toggle-type flip-flops 152, 154 and 156. Counter control signal Cc from detection circuit 34 is applied to a phase initialization circuit 160, which sets the phase of the interruption and sampling signals to suitable values, when supply power is first applied to the timepiece (i.e. when a timepiece battery is inserted). This circuit is composed of set/reset flop-flop 162, data-type flip-flop 172, AND gates 164 and 174, and three cascaded data-type flip-flops 166, 168 and 170. A phase shifting circuit 178 is composed of cascaded data-type flip-flops 177 to 183. Output signals from phase shifting circuit 178, together with the output signals from phase initialization circuit 160, are applied to a set of selector gate circuits 184 to 194 in sampling signal generating circuit 176. Interruption signals 01 and 02, and sampling signals S1 and S2 are produced by sampling signal generating circuit 176, the timing of which are determined by the count value in phase initialization circuit 160 and by the logic level of status control signal Sc applied to the sampling signal generating circuit 176.

The operation of the second embodiment will now be described with reference to FIG. 12 and FIG. 13, and the waveform diagrams of FIG. 14 to FIG. 18. Signals $\phi 1$ and $\phi 2$ determine the duration for which a drive signal is applied to drive coil 18, and are produced by FF 116 and 118 in waveform converter circuit 30, in response to signals $\phi 14$ and $\overline{\phi 14}$ from frequency divider circuti 28, together with reset signal $\phi 11$ from FF 110. A modulation signal Pm is produced by a selector circuit 119, which is controlled by the status control signal Sc. When the status control signal is at a high logic level, the signal $\phi 10$ from FF 108 is passed through selector circuit 119, to appear as signal Pm. When signal Sc is at the L logic level, the output of an OR gate 117 is passed by selector circuit 119 as signal Pm. This signal is the logical OR product of signals $\phi 9$ and $\phi 10$, which comprises a high frequency signal of the same frequency as signal $\phi 10$, but with increased duty cycle. Thus, the duty cycle of modulation signal Pm can be increased or decreased by changing the status control signal Sc to the L or the H logic level, respectively. Modulation signal Pm is applied to NAND gates 120 and 122 together with signals $\phi 1$ and $\phi 2$ respectively, so that a modulated signal comprising successive bursts of high frequency pulses is produced from gates 120 and 122, designated as $\phi 3$ and $\phi 4$ respectively having the form shown in FIG. 14. Signals $\phi 3$ and $\phi 4$ are input to drive circuit 32, and also to inputs of AND gates 124 and 126 respectively. Interruption signals 01 and 02 are also input to AND gates 124 and 126 respectively, which produce drive input signals $\phi 5$ and $\phi 6$. These signals are also input to drive circuit 32, to the gates of N-channel transistors 132 and 134 respectively. Signals $\phi 3$, $\phi 4$, $\phi 5$ and $\phi 6$ control drive circuit 32 to apply a modulated drive pulse across terminals a and b of stepping motor drive coil 18, effectively short-circuit the drive coil terminals upon the termination of a modulated drive pulse, and then open-circuit terminals a and b of drive coil 18 for a short interval determined by interruption signal 01 or 02, in a similar manner to that which has been described in detail hereinabove with respect to the first embodiment of the present invention.

The operation of drive circuit 32 will therefore not be described further.

Sampling signal generating circuit 176 also produces sampling signals S1 and S2, which consist of short-duration pulses occurring during an 01 interruption signal pulse and an 02 pulse, respectively. The waveform of the current which flows through stepping motor drive coil 18 is shown, as Iab, in FIG. 5. As shown, the current flow goes to zero during each interruption signal pulse. The upper two waveforms of FIG. 6 illustrate the corresponding voltages which appear at terminal a of stepping motor drive coil 18 and terminal b, as Va and Vb respectively, with respect to ground potential. The waveforms of FIG. 5 and 6 apply to the case of operation in the normal detection status, with a normal load applied to the stepping motor 10. Thus, during an 01 interruption signal pulse, the detected voltage pulse Va from stepping motor drive coil 18 is above the detection threshold set by inverter 136 of detection circuit 34. Thus, an H level (inverted) input is applied to selector circuit 140 concurrently with a sampling signal S1 pulse. The output signal Cc from selector circuit 140 therefore goes to the H level momentarily, thereby resetting FF 144. Subsequently, when the output signal from AND gate 148 (the logical sum of signals $\phi 12$ and $\phi 13$) goes to the H level, AND gate 146 is inhibited by the output of FF 144, so that the state of FF 150 remains unchanged, with an H level output constituting the status control signal Sc. In this condition, (the normal detection status), a drive input signal consisting of pulse bursts with a low duty cycle are applied to drive circuit 32. In other words, normal power drive pulses are applied to stepping motor drive coil 18.

Figure 16:
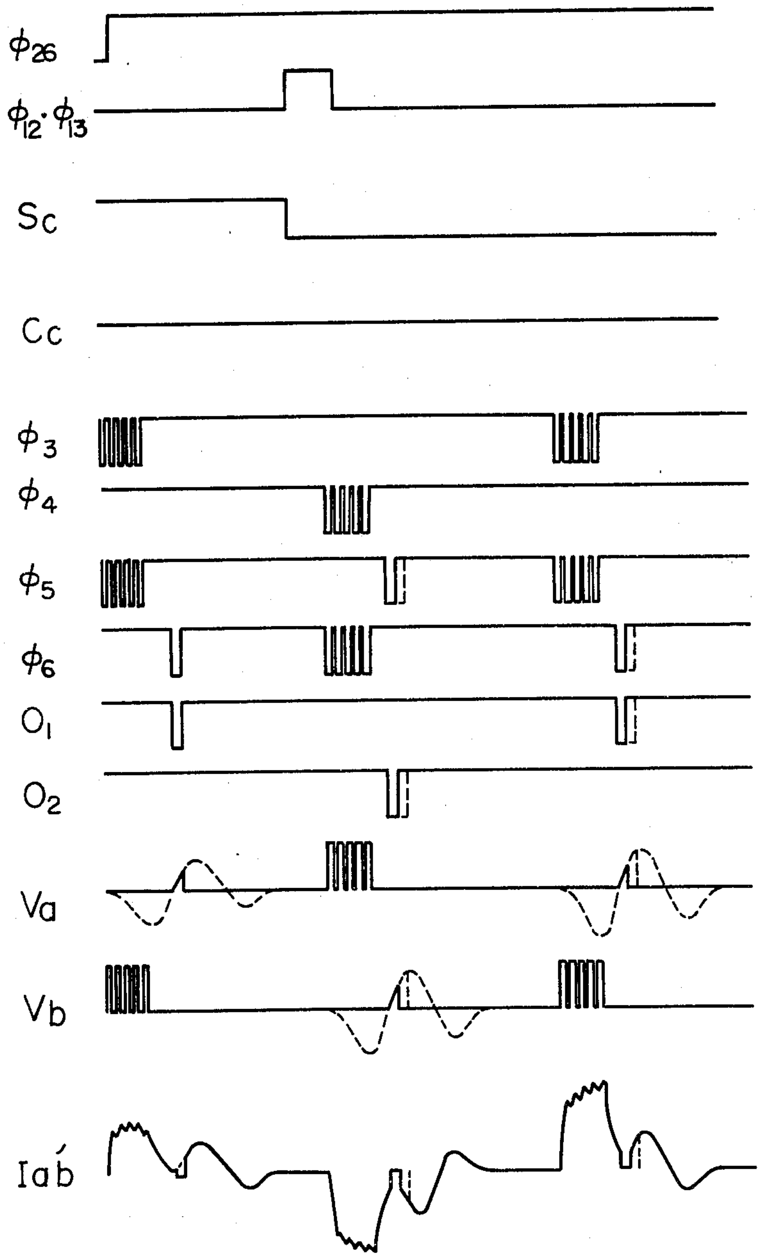

If the detection signal from stepping motor drive coil 18 is below the threshold level due to a high load having been applied to the stepping motor, then the output of FF 144 will remain at the H level after it is set by the next $\phi 1$ or $\phi 2$ pulse at the start of the next one-second drive interval. If the detected coil voltage is still below the threshold level during the next sampling period (i.e. of the detected coil voltage is below the threshold level during two consecutive one-second drive intervals), then the output from AND gate 148 ($\phi 12+\phi 13$) will produce an H level output from AND gate 146, resetting FF 150. The status control signal Sc thereby goes to the L logic level. The timepiece circuit now enters the increased drive detection status, and the duty cycle of modulation signal Pm from gate 119 is increased, as described previously, so that the power delivered to stepping motor 10 by the next drive pulse burst is increased, i.e. increased power drive pulses are applied. This process is illustrated by the waveforms of FIG. 16.

When the status control signal goes to the L logic level, a reset condition of the counter circuit composed of FFs 152, 154 and 156 in detection circuit 34 is released. The output of OR gate 142 ($\phi 1+\phi 2$) is applied to the input of FF 152, and is counted by FFs 152, 154 and 156. Thus, after a predetermined number of one-second drive intervals, FF 150 is set by the output of FF 156. If the detected voltage from drive coil 18 is now above the detection threshold, then the output of FF 150, i.e. status control signal Sc, will thereby be returned to the H level. The normal detection status will thus be entered, and drive pulse bursts of low duty cycle, i.e. normal power drive pulses, will be applied to stepping motor drive coil 18. If, on the other hand, the detected coil voltage is still below the detection threshold level when the output of FF 156 goes to the H level, the FF 150 will be rapidly reset by the output of gate 146, and the increased drive detection status will be maintained. The use of the counter composed of FF 156, 154 and 152 helps ensure stable operation, since a transient increase in the detected coil voltage above the detection threshold will not cause an undesired transition from the increased drive to the normal detection status.

The manner in which the phase of the detection sampling process is automatically initialized to compensate for slight variations in stepping motor characteristics, and the way in which the timing of the detection sampling is changed over between the normal detection status and the increased drive detection status, will now be explained. Referring to FIG. 13, phase initialization circuit 160 contains a ring counter composed of FF 166, 168 and 170. Only one output of these flip-flops is at the H level at time. A set/reset flip-flop 162 receives a counter control signal Cc from detection circuit 34 at a reset terminal, and the output of an AND gate 174 at a set terminal. The output of AND gate 174 is also applied to the set terminal of FF 170, and to the reset terminals of FF 166 and 168. The output of FF 162 is applied to an input of an AND gate 164, and the OR product of signals $\phi 1$ and $\phi 2$, i.e. ($\phi 1+\phi 2$) is applied to the other input of AND gate 164. The output of AND gate 164 is applied to the clock input terminal of FF 166. The H level potential, i.e. $V_{DD}$, is applied to the date input terminal of FF 160. The inverted output of FF 172 is applied to one input of AND gate 174, while voltage $V_{DD}$ is applied to the other input. High frequency signal $\phi 9$ is applied to the clock input terminal of FF 172.

Phase shifting circuit 178 constitutes a shift register circuit composed of cascaded data-type flip-flops 177 to 183. High frequency signal $\phi 9$ is applied to the clock terminal of each of FF 177 to 183, while signal ($\phi 1+\phi 2$) is applied to the reset terminal of each. Thus, following each drive pulse, the outputs Q1 to Q7 from FF 177 to 183 successively go to the H level in synchronism with successive pulses of signal $\phi 9$.

Sampling signal generating circuit 176 includes selector gate circuits 184 to 194, which receive various combinations of signals Q1 to Q7 and Q3 to Q7 from phase shifting circuit 178. The outputs from selector circuits 184 to 194 are combined in AND gates 196 to 202 as shown. The outputs of AND gates 196 and 198 are applied to selector gate circuits 204 and 206 respectively, while the outputs of AND gates 200 and 202 are applied to selector gate circuits 204 and 206 respectively. Selector gate circuits 204 and 206 are controlled by status control signal Sc. When status control signal Sc is at the L logic level, then output signals from the AND gates 200 and 202 respectively, i.e. signals formed by outputs from selector gates 190 to 194, are output from selector gate 204 and 206 respectively. When status control signal Sc is at the H logic level, then output signals from the AND gates 196 and 198, i.e. signals formed by outputs from the selector gates 184 to 188, are produced from selector gates 204 and 206 respectively.

The output signal from selector gate 204 is output during alternate one-second drive cycles from NAND gates 208 and 200 respectively, in response to signals $\phi 14$ and $\overline{\phi 14}$ applied thereto respectively, as interruption signals 01 and 02 respectively. The output signal from selector gate 206 is output during alternate one-second drive cycles from NAND gates 212 and 214 respectively, in response to signals $\phi 14$ and $\overline{\phi 14}$ applied thereto respectively, as sampling signals S1 and S2 respectively.

The operation of the circuit of FIG. 13 will now be described. When power is first applied to the timepiece circuitry, i.e. when the timepiece battery is inserted, the inverted output from FF 172, which is applied to AND gate 174, will initially go to the H logic level. As a result, since the H level is applied to the other input of AND gate 174, the output of AND gate 174 will go to the H logic level. FF 162 will thereby be set, so that an H level output is applied therefrom to the input of AND gate 164. FF 170 will also be set, while FF 166 and 168 will be reset. Thus, in this condition, only the output from FF 170 of the ring counter made up of FF 166 to 170 will be at the H logic level, while the outputs of FF 166 and 168 will be at the L logic level. Upon the first pulse of signal $\phi 9$ produced subsequently, the inverted output of FF 172 will go to the L logic level so that the output of AND gate 174 goes to the L logic level.

Figure 17:
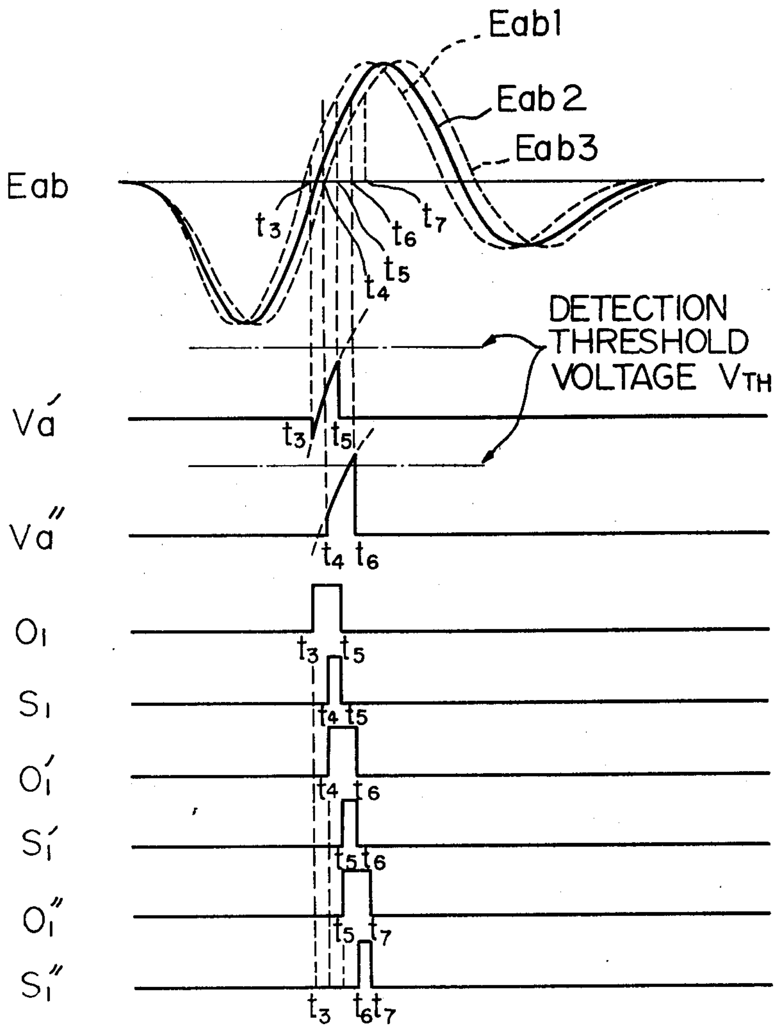
FIG. 17 and FIG. 18 are waveform diagrams illustrating the manner in which the second embodiment of the present invention performs automatic adjust ment of the timing of coil voltage detection, so as to compensate for variations in stepping motor characteristics.

When the first drive pulse is generated after power has been applied to the timepiece, then signal $(\phi 1+\phi 2)$ will go to the H level during the drive pulse. The output of AND gate 164 will therefore go to the H level, causing the output of FF 166 to go to the H level in response to the H level input applied to its data terminal from FF 170. In this condition, only the output of FF 166 is at the H level, while that of FF 168 and 170 is at the L level. As a result, the timing of the interruption interval and sampling interval occurring after the first drive pulse will be as indicated by interruption pulse 01 and sampling pulse S1 in FIG. 17, i.e. from t3 to t5 and from t4 to t5 respectively. In FIG. 17, the manner in which the phase of the induced voltage of drive coil 18 can vary, depending upon the particular characteristics of the individual stepping motor, is indicated by the three curves Eab1, Eab2 and Eab3, which represent the induced drive coil voltage characteristics of three different stepping motors. In the case of the stepping motor having the characteristic designated as Eab2, the configuration of the detected drive coil voltage signal, during the period of interruption of drive coil current from t4 to t5, is indicated as Va′ in FIG. 17. The detection threshold voltage is indicated as $V_{th}$, and it can be seen that for the characteristic Eab2, the detection signal peak amplitude is below the detection threshold during the sampling interval from t4 to t5. On the other hand, for stepping motors having the induced drive coil voltage characteristics Eab2 and Eab3, the detection signal peak amplitude would be above the detection threshold level.

In the case of characteristic Eab2, since the detection signal amplitude is below the detection threshold, counter control signal Cc will remain at the L level during the sampling interval which follows the first drive pulse. When the next drive pulse is produced, the ring counter composed of FF 166 to 170 is again advanced by the output from AND gate 164, so that now the output from FF 168 is at the H level, while that from FF 166 and 170 is at the L level. As a result, the timing of the next interruption and sampling signal pulses, indicated as 01′ and S1′ in FIG. 17, will have the timings from t4 to t6 and t5 to t6 respectively. It can be seen that the phase of the sampling of the drive coil induced voltage has been advanced so that, for a stepping motor having the characteristic Eab2, the detection signal voltage will be above the threshold voltage level during the sampling interval from t5 to t6. Since in this case an H level output signal is produced from detection circuit 34, as counter control signal Cc, the FF 162 will be reset, so that AND gate 162 is inhibited from applying further clock input signals to FF 166. Thereafter, therefore, the output of FF 168 will remain at the H level, and sampling and interruption signals pulses 01 (and 02) and sampling signal pulses S1 (and S2) will be produced with the phase relationships indicated as 01′ and S1′, with respect to the timing of each drive pulse.

The above explanation, and the contents of FIG. 17, are based on the assumption that the timepiece is in the normal load condition when power is first applied. Subsequently, when an increased load is applied to the stepping motor, then the output signals from AND gates 196 and 198 will be utilized to produce signals 01, 02, and S1, S2, due to status control signal going to the H logic level. In this case, with the output of FF 168 at the H level, sampling signal generating circuit 176 will produce interruption signal pulses and sampling signal pulses having timing t2 to t4 and t3 to t4 respectively.

Figure 18:
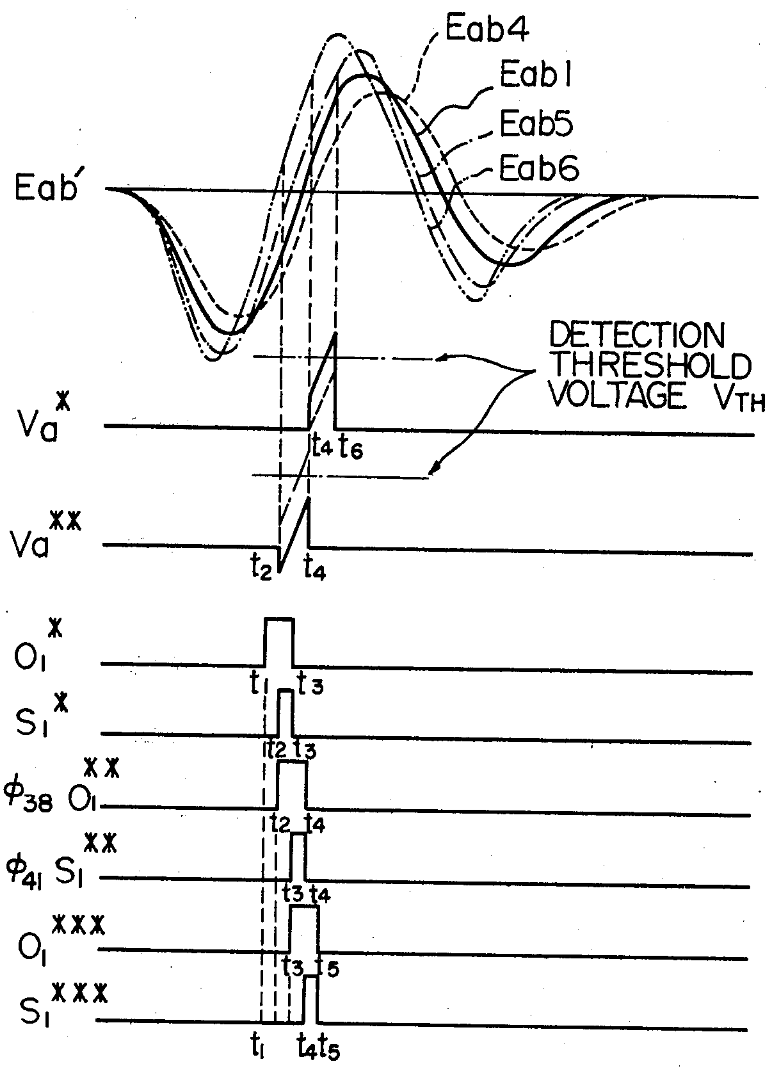

The operation of the circuit of FIG. 13 in the increased drive detection status, i.e. when the status control signal goes to the L logic level, will now be discussed with reference to the waveform diagram of FIG. 18. In FIG. 18, it is assumed that the stepping motor has the induced drive coil voltage characteristic Feb2 described with reference to FIG. 17, when a normal load level is applied to the motor. When an increased load is applied to the stepping motor, the induced drive coil voltage characteristic becomes as indicated by Eab4 in FIG. 18. When the drive pulse power is increased in response to the increased load, i.e. the increased drive detection status is entered, then the characteristic becomes as indicated by Eab5. When the increased load is subsequently removed, with the increased power drive pulses still applied, the characteristic of drive coil induced voltage becomes as indicated by Eab6.

The range of possible settings of the interruption and sampling signals 01, 02, and S1, S2 relative to the drive pulse timing, when in the increased drive detection status (status control signal Sc at the L logic level) are indicated as 01*, S1*, 01, S1** and 01***, S1*** respectively. As described above, when phase initialization circuit 160 is preset automatically by counter control signal Cc such that the output of FF 168 is at the H level, then when the increased drive detection status is entered, the timing of the interruption and sampling signal pulses becomes t2 to t4 and t3 to t4 respectively. In other words, the timing of interruption and sampling becomes as indicated by waveforms 01** and S1** respectively in FIG. 18**. This transition of the sampling timing is indicated by the detection signal Va*, which shows the form of the detection signal voltage from drive coil 18 during normal load (full line waveform) and under increased load (broken line waveform). When the sampling interval timing is changed to the timing S1* (from t2 to t3), then, when the drive coil voltage under increased load and increased drive (Eab5) is sampled, the detection signal peak amplitude is below the detection threshold voltage Vth, as indicated by the full line waveform Va. When the increased load is removed, and the drive coil voltage Eab6 is sampled, then as indicated by the broken line waveform Va, the peak amplitude of the detection signal is above the detection threshold. A transition to the normal detection status will subsequently occur, as described previously, and the resultant return of status control signal Sc to the H logic level will result in the phase of the interruption and sampling signals being returned to the timings t4 to t6 and t5 to t6 respectively, i.e. as indicated by waveforms 01' and S1' in FIG. 17.

From the above description, it will be seen that the phase initialization circuit of FIG. 13 automatically sets the timing of the sampling and interruption signal pulses, relative to the drive pulses, to suitable values for the characteristics of a particular stepping motor. For a stepping motor having the drive coil induced voltage characteristic designated as Eab1 in FIG. 17, the timing of the interruption and sampling signals would be as indicated by 01 and S1 therein, i.e. from t3 to t5 and t4 to t5 respectively. For a stepping motor having the characteristics designated as Eab2, the timing of the interruption and sampling signals would be automatically adjusted to 01' and S1' respectively (i.e. from t4 to t6 and from t5 to t6), while for a stepping motor having the drive coil induced voltage characteristic Eab3, the timing of the interruption and sampling signals would be automatically set to 01" and S1" respectively, i.e. from t5 to t7 and t6 to t7 respectively. The timing of the interruption and sampling signal pulses in the normal detection status are thus set to suitable values (such that the detection signal will exceed the detection threshold when a normal load is applied to the stepping motor and will be below the threshold when an increased load is applied).

Figure 19A:
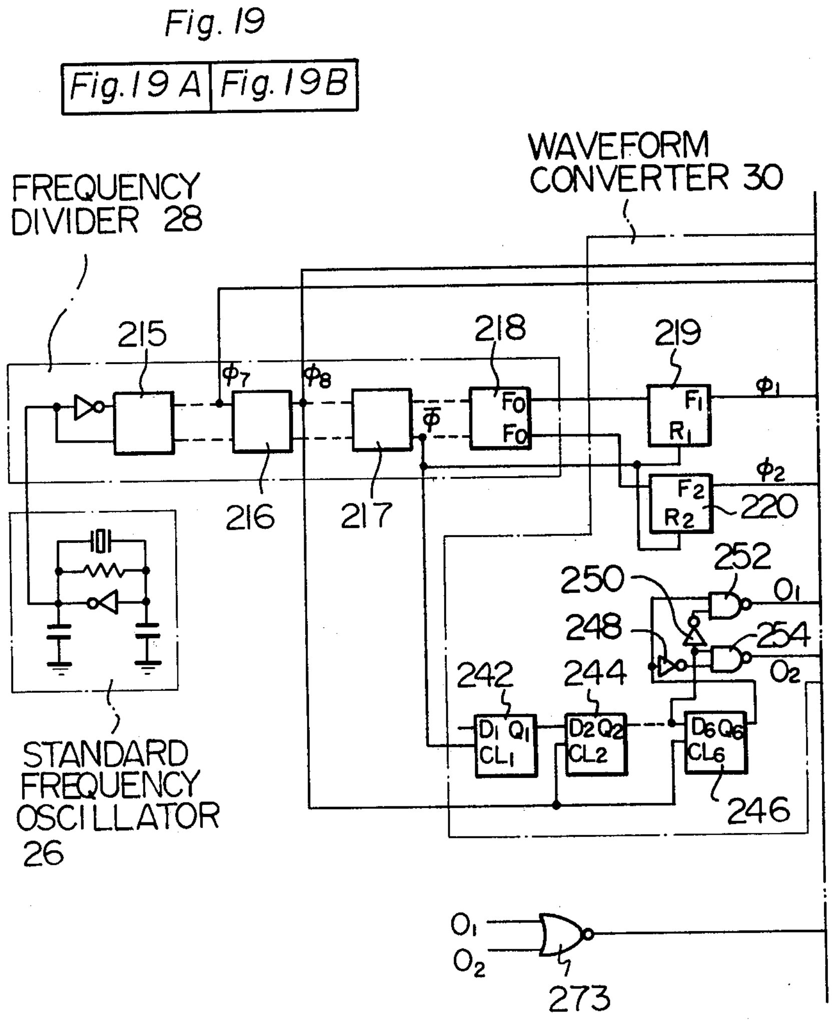
FIGS. 19A and 19B are circuit diagrams of a third embodiment of an electronic timepiece according to the present invention, in which changeover of the detection status of the drive control system is performed by changing the threshold voltage level at which the drive coil voltage is detected.
Figure 19B:
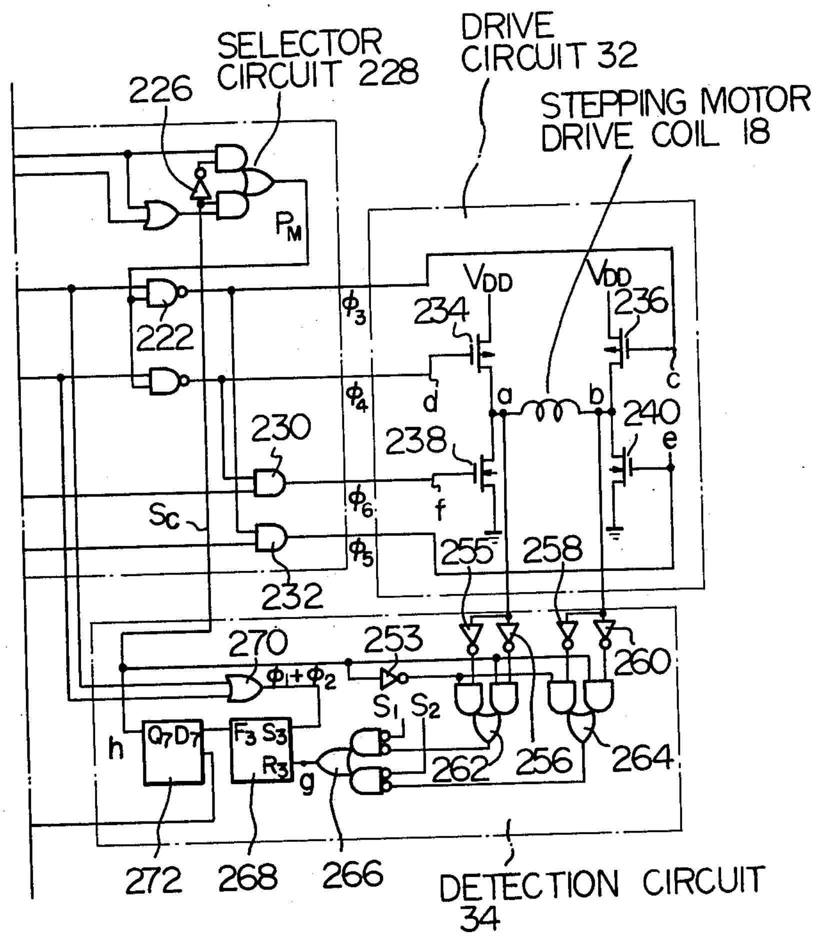
Figure 20:
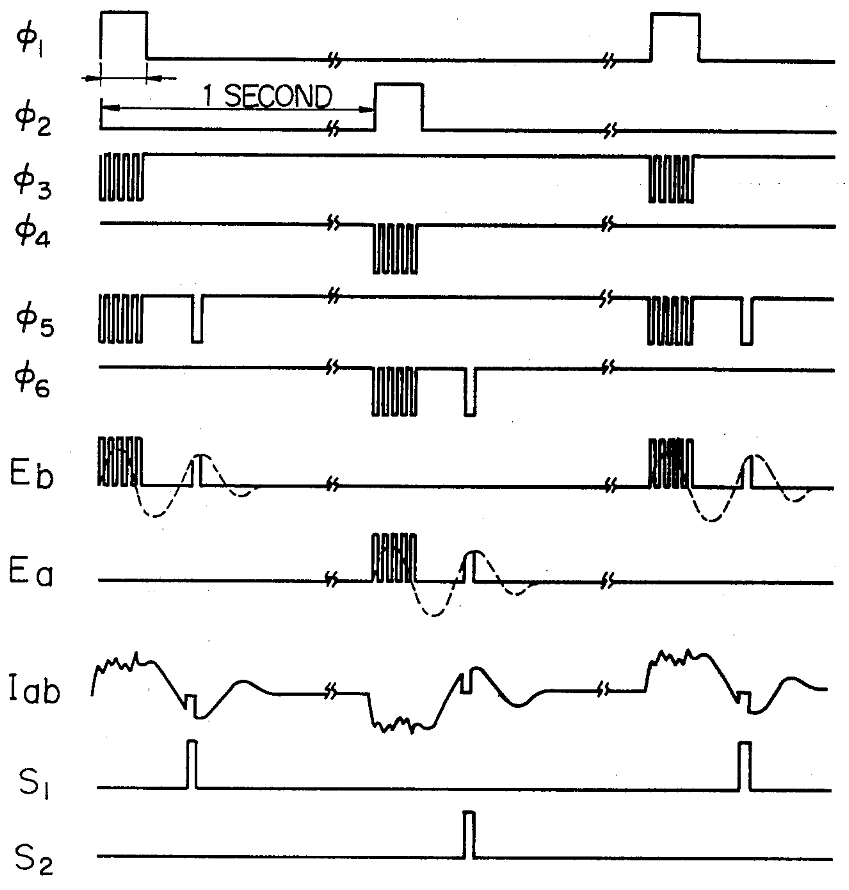
FIG. 20, FIG. 21 and FIG. 22 are waveform diagrams illustrating the operation of the third embodiment of FIG. 19.

A third embodiment of the present invention will now be described, with reference to the circuit diagram of FIG. 19. This embodiment differs from the first two described hereinabove, in that the change from the normal detection status to the increased power detection status is performed by changing the level of the detection threshold voltage. A standard frequency oscillator supplied a timebase signal to a frequency divider circuit 28, comprising a chain of cascaded flip-flops, the first and last of which are designated as 215 and 218 respectively. The unit time signal output of frequency divider circuit 28 is applied to flip-flops 219 and 220, which produce signals $\phi 1$ and $\phi 2$, having the waveforms shown in FIG. 20. A selector circuit 228 produces a modulation signal Pm of either a low or a high duty cycle, in accordance with the logic level of a status control signal Sc, in a similar manner to that described for the second embodiment hereinabove. Modulation signal Pm is applied to NAND gates 222 and 224, together with signals $\phi 1$ and $\phi 2$ respectively, whereby modulated drive input signals $\phi 3$ and $\phi 4$ are produced, to be input to a drive circuit 32. Thus, when status control signal Sc is at the L logic level, drive pulse bursts of relatively low duty cycle, i.e. normal power drive pulses, are applied between terminals a and b of drive coil 18. When signal Sc goes to the H logic level, the duty cycle of modulation signal Pm is increased, so that drive pulses of increased power are applied to stepping motor drive coil 18. In this embodiment of the present invention, the timing at which sampling of the voltage from stepping motor drive coil 18 is performed is fixed, and occurs at a predetermined time after each drive pulse burst. A counter circuit which includes data-type flip-flops 242, 244 and 246 receives a signal $\phi 9$ from an intermediate stage of waveform converter circuit 30, and signal $\phi 8$. The resultant signal produced from the output of FF 246 is applied to one input of a NAND gate 252 and to an inverter 248 input. The output of the counter stage preceding FF 246 is applied to an input of a NAND gate 254 and to an inverter 250. As a result, an interruption signal pulse 01 is produced after a predetermined delay after each $\phi 1$ pulse, and interruption signal pulse 02 is produced after the same delay following a $\phi 2$ pulse. Drive input signals $\phi 5$ and $\phi 6$ are thereby produced by AND gates 230 and 232, which serve to interrupt the flow of current in stepping motor drive coil 18 for sampling the drive coil voltage, as in the preceding embodiments.

The operation of detection circuit 34 will now be described. The detection threshold voltage in the normal detection status, i.e. when the status control signal Sc is at the L logic level, is determined by the characteristics of inverters 254 and 258 at the input to detection circuit 34. The detection threshold level in the increased drive detection status, i.e. when the status control signal Sc is at the H logic level, is determined by inverters 256 and 260. The threshold voltage of each of inverters 256 and 260 is higher than that of inverters 255 and 258. Selection of inverters 255 and 258 in the normal detection status is performed by the inverted status control signal Sc which is output from an inverter 253, acting on selector circuits 262 and 264. Selection of inverters 256 and 260 in the increased drive detection status is performed by the H level status control signal Sc being applied to selector circuits 262 and 264. The output signals from selector circuits 262 and 264 are applied to inverting inputs of a selector circuit 266, which is controlled by selector signals S1 and S2 to perform detection only during predetermined time intervals. Selector signals S1 and S2 can consist of the interruption signals 01 and 02. Otherwise, selector signals S1 and S2 can be generated by simple circuit means to have a pulse width different from that of signals 01 and 02, as in the case of the first two embodiments.

Figure 21:
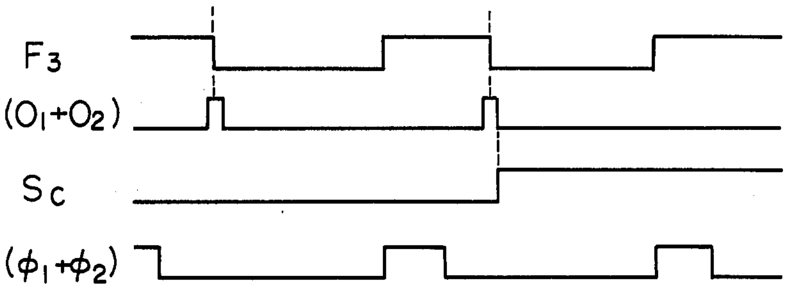

If the detected voltage of stepping motor drive coil 18 is above the threshold level during the sampling interval, then an H level output will be produced by selector circuit 266 which will reset the set/reset flip-flop 268. The output from FF268 therefore goes to the L logic level, as shown in FIG. 21, in which the output of FF 268 is designated as F3. Signal F3 is applied to the data input of a data-type flip-flop 272. Interruption signals 01 and 02 are applied to the inputs of a NOR gate 273, the output of which is applied to the clock terminal of FF 272. The output of FF 272 therefore goes to the L level in accordance with the level of signal F3, at the end of the sampling interval in which the detected coil voltage was above the threshold level.

Figure 22:
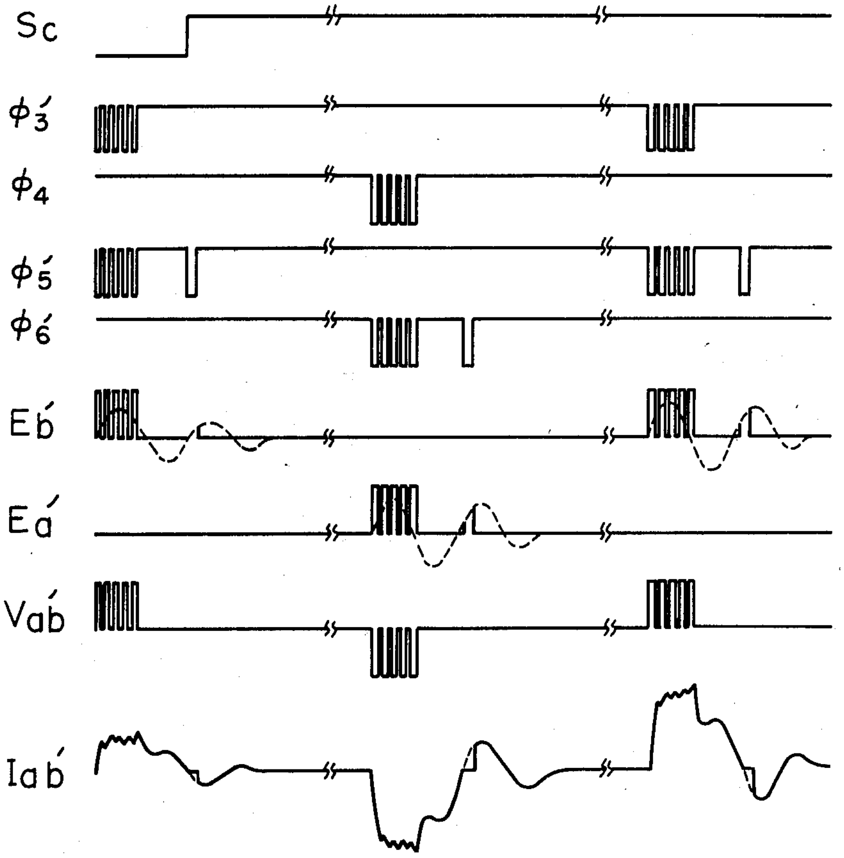

At the start of each one-second drive interval, FF 268 is set by the output of OR gate 270, i.e. by signal $(\phi 1+\phi 2)$. Thus, if the load on stepping motor 10 increases to a level at which the detected coil voltage falls below the threshold level, FF 268 will remain in the set state, so that the output of FF 272 will also go to the H level, in response to the clock signal applied from NOR gate 273. The circuit is now in the increased drive detection status, in which a higher level of detection threshold voltage is selected, as described hereinabove. FIG. 22 is a waveform diagram illustrating how the voltages and current waveforms of drive circuit 32 vary when an increased load is applied to stepping motor 10 and a change from the normal detection status to the increased drive detection status occurs. As shown, when the increased drive detection status is entered, the amplitude of the drive current Iab' which flows in stepping motor drive coil 18 is substantially increased, as is the oscillatory current which flows subsequently when the stepping motor drive coil 18 is short-circuited. Thus, the amplitude of the drive coil voltage during each sampling interval increases significantly. However, since the detection threshold of detection circuit 34 is increased when the increased drive detection status is entered, as explained above, the status control signal Sc produced by detection circuit 34 is maintained at the H logic level.

Figure 23A:
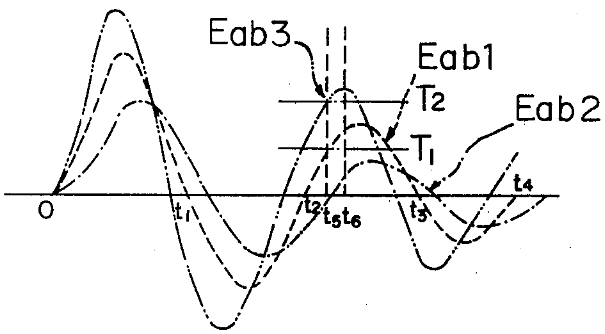
FIG. 23A and 23B are waveform diagrams illustrating the manner in which the detection status of the third embodiment drive control system is changed over by changing the detection threshold voltage level.
Figure 23B:
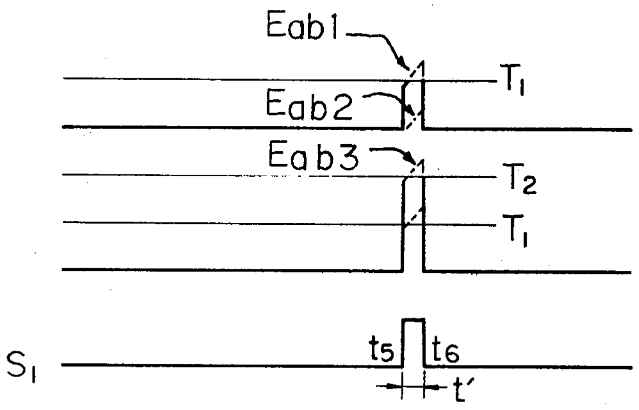

The operation of detection circuit 34 is also illustrated by the waveform diagrams of FIG. 23*a* and 23*b*. In FIG. 23A, the waveform of the voltage developed in stepping motor drive coil 18 when a normal load is applied to stepping motor 10 with normal drive power is indicated as Eab1. The corresponding voltage waveform when an increased load is applied to stepping motor 10 with normal drive power pulses applied to stepping motor drive coil 18 is indicated as Eab2. The corresponding voltage waveform when a normal load is applied to stepping motor 10 with increased power drive pulse bursts applied to stepping motor drive coil 18 is indicated as Eab3. The detection threshold voltage in the normal detection status is indicated as T1, and the threshold voltage in the increased drive detection status is indicated as T2. As shown in FIG. 23B, during the sampling interval t5 to t6, with a normal load applied to the stepping motor, the level of voltage Eab1 exceeds the threshold level T1. When an increased load is applied to the stepping motor, the voltage developed during the sampling interval, Eab2, falls below the threshold level T1, so that a change is made from the normal detection status to the increased load detection status, as described previously, so that the increased drive detection status is entered, and the detection threshold level is raised to T2. In this condition, the detected coil voltage is below threshold level T2. Subsequently, when the increased load condition is removed, the detected coil voltage during the sampling interval, Eab3, rises above threshold level T2, so that a transition to the normal detection status is performed, i.e. the detection threshold level becomes T1, and normal drive power pulse bursts are applied to stepping motor drive coil 18.

Figure 24:
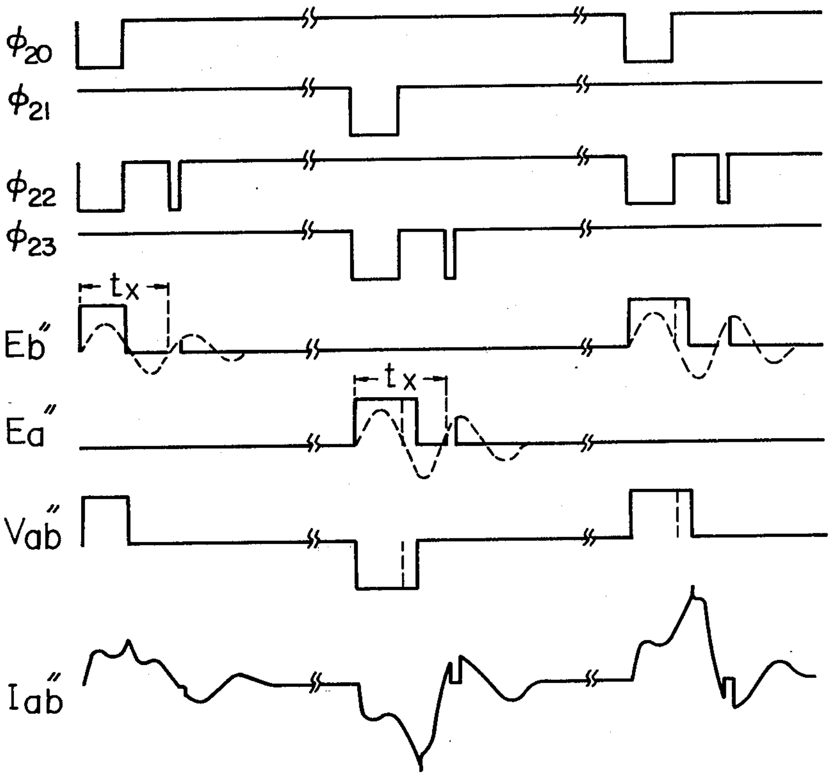
FIG. 24 is a waveform diagram illustrating the operation of a modified form of the third embodiment of the present invention, in which single continuous drive pulses are utilized rather than drive pulse bursts.

In the third embodiment of the present invention described above, the drive power is controlled by utilizing modulated drive pulse bursts, and varying the duty cycle of the high frequency pulses in each pulse burst. However, the principle of altering the detection status by changeover between two different detection threshold voltages is also applicable to a drive system in which control is performed by changing the duration of a single (i.e. unmodulated) drive pulse. The waveforms for such a modification of the third embodiment are shown in FIG. 24. Here, $\phi$20 and $\phi$21 are the drive input signals corresponding to $\phi$3 and $\phi$4 of the third embodiment, while signals $\phi$22 and $\phi$23 correspond to drive input signals $\phi$5 and $\phi$6 of the third embodiment. As shown, each sampling interval is initiated at a fixed time following the start of a drive pulse, i.e. after a time interval $t_x$.

Figure 25:
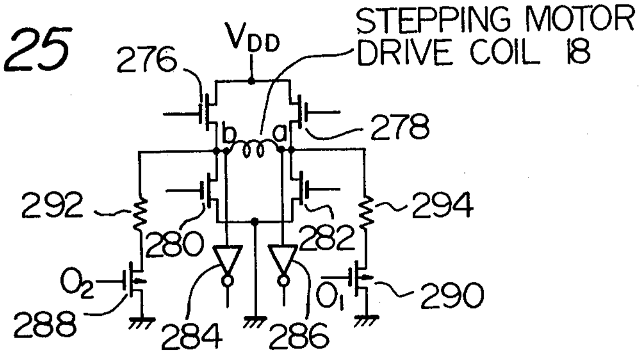
FIG. 25 is a circuit diagram illustrating a modification which may be performed upon the described embodiments of the present invention, whereby a resistance of known value is connected between the terminals of the stepping motor drive coil during the time at which detection of the drive coil voltage is performed.

The present invention can also be modified to provide a high resistance of predetermined value between the terminals of drive coil 18 during each sampling interval. An example of such a modification is illustrated in FIG. 25, in which a stepping motor drive coil 18 is driven by transistors 276 to 282, and in which the voltage developed across the terminals a and b of drive coil 18 are detected by inverters 284 and 286, having a predetermined detection threshold level. During a sampling interval in which drive transistor 282 is set in an open-circuit condition, a signal 01 is applied to the gate of a transistor 290, which is connected in series with a resistor 294 between terminal a of drive coil 18 and ground. Signal 01 consists of a pulse whose duration is substantially equal to the interval during which transistor 282 is in the open-circuit state, and of such a polarity as to set transistor 290 in a conducting condition, so that the resistance placed between terminal a of drive coil 18 and ground is determined by the value of resistor 294. At all other times, transistor 290 is held in the open-circuit condition.

Similarly, during each interval in which drive transistor 280 is in the open-circuit condition, signal 02 applied to the gate of transistor 288 causes the resistance between terminal b of drive coil 18 an ground to be determined by the value of resistor 292. At all other times, transistor 288 is held in the open-circuit condition.

From the above description of the various embodiments of the present invention, it will be appreciated that an electronic timepiece incorporating a stepping motor drive control system in accordance with the present invention will provide reliable operation of the stepping motor, in spite of variations on the load applied to the stepping motor, and variations in the drive power available for the stepping motor due to changes in timepiece battery voltage with time, temperature, etc., and will provide such reliable operation even with the drive power level applied to the stepping motor held to a minimum operating level during a normal load operating condition and to a minimum operating level during an increased load operating condition, respectively. Since it is not necessary to provide an excessive margin of drive power during normal load operation to ensure reliable operation under heavy load or decreased battery voltage conditions, the amount of power consumed by the timepiece battery can be minimized to a greater extent than has heretofore been possible. While various other schemes and proposals have been described in the prior art for accomplishing the objectives of the present invention, the various disadvantages of such prior art proposals, as described hereinabove, are eliminated by the present invention.

From the preceding description, it will be apparent that the objective set forth for the present invention for effectively attained. Since various changes and modifications to the above construction may be made without departing from the spirit and scope of the present invention, it is intended that all matter associated in the above description, or shown in the accompanying drawings, shall be interpreted as illustrative, and not in a limiting sense. The appended claims are intended to cover all of the generic and specific features of the invention described herein.

What is claimed is:

1. An electronic timepiece powered by a battery, comprising, in combination:

- a source of a standard frequency signal;
- a frequency divider circuit responsive to said standard frequency signal for producing a unit time signal comprising a train of pulses;
- waveform converter means responsive to said unit time signal in conjunction with a relatively high frequency signal produced by said frequency divider circuit for producing a drive input signal;
- a drive circuit responsive to said drive input signal for producing a drive signal;
- a stepping motor having a drive coil coupled to receive said drive signal, and periodically actuated by said drive signal to rotate a rotor thereof through a predetermined angle;

time indicating means driven by said stepping motor for indicating time information;

a sampling signal generating circuit for generating sampling signal pulses of a different phase in dependence on a state of said stepping motor; and a detection circuit having input terminals coupled across said stepping motor drive coil and responsive to said sampling signal pulses for detecting the amplitude of a voltage developed across said drive coil during a sampling interval and producing a status control signal at first and second logic levels in dependence on said detected drive coil voltage;

said waveform converter means including means responsive to said first logic level of the status control signal for producing a first drive input signal to cause said drive circuit to drive said stepping motor in a first operating state, and responsive to said second logic level of the status control signal for producing a second drive input signal to cause said drive circuit to drive said stepping motor in a second operating state.

2. An electronic timepiece according to claim 1, in which said drive input signal comprises bursts of relatively high frequency pulses, and in which said sampling signal generation circuit generates an interruption signal comprising a train of pulses each generated after a predetermined time interval following one of said drive input signal pulses and generates said sampling signal pulses, each occuring during a corresponding one of said interruption pulses, said interruption pulses being applied to said drive circuit for thereby establishing an open circuit condition across said stepping motor.

3. An electronic timepiece according to claim 2, in which said detection circuit further produces a counter control signal comprising a pulse produced when said detected drive coil voltage is detected to be above a threshold level during said sampling interval and further comprising:

a phase initialization circuit comprising a counter circuit, means for resetting said counter circuit to a predetermined initial count when power is initially applied to said electronic timepiece, and means for applying said unit time signal pulses to said counter circuit to be counted therein after power is initially applied to said electronic timepiece and for inhibiting further input of said unit time signal pulses to said counter subsequent to the occurrance of a first one of said counter control signal pulses after power is initially applied to said electronic timepiece; and a phase shifting circuit having a plurality of cascaded stages and responsive to said unit time signal pulses and to a clock signal produced by said frequency divider circuit for producing a succession of pulses of successively delayed phase from successive ones of said cascaded stages following each of said unit time signal pulses;

said sampling signal generating circuit being coupled to receive said status control signal and said successively delayed pulses from said phase shifting circuit and being responsive thereto for producing each of said interruption signal pulses and said sampling signal pulses after a first predetermined time interval following each of said drive input signal pulse bursts when said status control signal is at said first logic level, and being further responsive thereto for producing each of said interruption signal pulses and said sampling signal pulses after a second predetermined time interval following each of said drive input signal pulse bursts when said status control signal is at said second logic level, said first and second predetermined time intervals being different in duration.

4. An electronic timepiece according to claim 3, wherein said phase shifting circuit comprises a shift register circuit having reset terminals thereof coupled to receive said unit time signal pulses and having a clock input terminal coupled to receive said clock signal from said frequency divider circuit.

5. An electronic timepiece according to claim 3 or 4, wherein said reset means of said phase initialization circuit comprises a flip-flop having an output terminal coupled to one potential of said battery and a clock input terminal coupled to receive a clock signal from said frequency divider circuit and a first gate circuit coupled to receive an output signal from said flip-flop at one input thereof and to receive said battery potential at another input thereof, with the output of said first gate circuit being applied to a reset terminal of said counter circuit of said phase initialization circuit for resetting the contents thereof when power is initially applied to said electronic timepiece, and wherein said means for applying said unit time signal pulses to said counter circuit of said phase initialization circuit comprise a flip-flop circuit having a reset terminal coupled to receive said counter control signal pulses and a set terminal coupled to receive the output from said flip-flop of said reset means, and a second gate circuit having a first input coupled to receive said unit time signal pulses and a second input coupled to receive an output from said flip-flop circuit, the output of said second gate circuit being applied to a clock input terminal of said phase initialization circuit, said second gate circuit thereby controlling input of said unit time signal pulses to said phase initialization circuit counter in accordance with the state of said flip-flop circuit.

6. An electronic timepiece according to claim 5, in which said sampling signal generating circuit comprises a first selector gate circuit coupled to receive a plurality of combinations of said phase initialization circuit counter output signals and said phase shifting circuit output signals for thereby producing a plurality of output signals, and a second selector gate circuit controlled by said status control signal and coupled to receive said output signals from said first selector gate circuit, and responsive to said status control signal for producing said interruption signal pulses and said sampling signal pulses after said first predetermined time interval following each of said drive input signal pulse bursts when said status control signal is at the first logic level, and for producing said interruption signal pulses and said sampling signal pulses after said second predetermined time interval following each of said drive input pulse bursts when said status control signal is at said second logic level.

7. An electronic timepiece according to claim 3, in which said detection circuit comprises:

a pair of inverters, each having an input connected to a corresponding end of said stepping motor drive coil;

a selector gate circuit coupled to receive output signals from said inverters, and conrolled by said sampling signal pulses for producing said counter control signal when a voltage developed across said stepping motor drive coil exceeds a threshold level of either of said pair of inverters during one of said sampling signal pulses;

a first flip-flop having a reset terminal coupled to receive said counter control signal at a reset terminal thereof and coupled to receive said unit time signal pulses at a set terminal thereof;

a first gate circuit coupled to receive an output from said first flip-flop at a first input thereof, and coupled to receive a clock signal from said frequency divider circuit at a second input terminal thereof;

a second flip-flop coupled to receive an output of said first gate circuit at a reset terminal thereof, for producing said status control signal at an output; and a counter circuit coupled to receive said status control signal at a reset terminal thereof, for being forcibly reset to a count value whereby an output is produced at said first logic level while said status control signal is at said first logic level, said output signal of said counter circuit being applied to a set terminal of said second flip-flop, said counter circuit further having a count input terminal coupled to receive said unit time signal pulses.

8. An electronic timepiece according to claim 1, in which said detection circuit detects the amplitude of said voltage developed across said drive coil during said sampling interval of a predetermined duration occurring after each periodic actuation of said stepping motor by said drive signal, said detection circuit operating in a normal detection status when a relatively low load torque is applied to said stepping motor and in an increased drive detection status when a relatively high load torque is applied to said stepping motor; said normal detection status being characterized in that a drive signal of relatively low power is applied to said drive coil and in that a transition to said increased drive detection status is executed by said control and detection circuit means when the amplitude of said detection signal falls below a first predetermined amplitude, and said increased drive detection status being characterized in that a drive signal of relatively high power is applied to said drive coil and in that a transition to said normal detection status is executed by said control and detection circuit means when the amplitude of said detection signal goes above a second predetermined amplitude.

9. An electronic timepiece according to claim 8, in which said detection circuit produces said status control signal which is at a first logic level potential during said normal detection status and is at a second logic level potential during said increased drive detection status, said status control signal being applied to said waveform converter circuit, which is responsive thereto for applying a first drive input signal to said drive circuit when said status control signal is at said first logic level potential and for applying a second drive input signal to said drive circuit when said status control signal is at said second logic level potential, said drive circuit being responsive to said first drive input signal for applying a drive signal of relatively low power to said drive coil, and responsive to said second drive input signal for applying a drive signal of relatively high power to said drive coil.

10. An electronic timepiece according to claim 9, in which said sampling interval begins after a predetermined time interval following the start of one of said periodic actuations of said stepping motor by said drive signal, and in which the duration of said predetermined time interval is identical in said normal detection status and in said increased drive detection status, and furthermore in which said second predetermined amplitude of said detection signal is higher than said first predetermined amplitude thereof.

11. An electronic timepiece according to claim 9, in which said sampling interval in said normal detection status is initiated after a first predetermined time interval following the start of one of said periodic actuations of said stepping motor by said drive signal, and in which said sampling interval in said increased drive detection status is initiated after a second predetermined time interval following the start of one of said periodic actuations of said stepping motor by said drive signal, and in which the duration of each of said first predetermined time intervals is different from that of each of said second predetermined time intervals, and furthermore in which said first predetermined amplitude and said second predetermined amplitude of said detection signal are identical.

12. An electronic timepiece according to claim 9, in which said drive signal comprises a train of drive pulses of alternating polarity.

13. An electronic timepiece according to claim 12, in which each of said drive pulses consists of a single uninterrupted pulse, and in which the duration of each of said drive pulses is increased and decreased in order to increase and decrease respectively the drive power applied to said stepping motor.

14. An electronic timepiece according to claim 12, in which each of said drive pulses comprises a burst of a predetermined number of relaively high frequency pulses, and in which the duty cycle of said relatively high frequency pulses is increased and decreased respectively in order to increase and decrease the drive power applied to said stepping motor.

15. An electronic timepiece according to claim 12, in which the timing of said sampling interval is determined by said sampling signal pulses, comprising a pulse of predetermined duration which is generated after a predetermined time interval following each of said drive pulses, said detection circuit being responsive to said sampling signal pulses for comparing the amplitude of said detection signal from said drive coil with a detection threshold voltage level.

16. An electronic timepiece according to claim 15, in which said sampling signal generation circuit generates an interruption signal comprising a pulse of predetermined duration which is generated during at least a portion of the duration of a sampling signal pulse, said drive circuit being responsive to said interruption signal in conjunction with said drive input signal for establishing an open circuit condition across said drive coil during each of said interruption signal pulses, and for establishing a short-circuit condition across said drive coil from the termination of a drive pulse to the start of an interruption pulse and from the termination of an interruption signal pulse to the start of the succeeding drive pulse.

17. An electronic timepiece according to claim 16, and further comprising means for connecting a predetermined high value of resistance between at least one end of said drive coil and ground potential during each of said interruption pulses.

18. An electronic timepiece according to claim 17, in which said connecting means comprises a transistor connected between ground potential and one terminal of a fixed resistor, with the other terminal of said resistor being connected to said at least one end of the drive coil, and with said interruption signal being applied to a control terminal of said transistor.

19. An electronic timepiece according to claim 15, in which each of said sampling signal pulses is generated during a predetermined one of a plurality of cycles of damped angular oscillation executed by said rotor of said stepping motor subsequent to the termination of a drive pulse.

20. An electronic timepiece according to claim 19, in which the timing of initiation of said sampling signal pulse during said cycle of angular oscillation of the rotor is controlled by said waveform converter circuit in accordance with a logic level potential of said status control signal.

21. An electronic timepiece according to claim 20, in which said waveform converter circuit is responsive to a transition of said status control signal from said first logic level potential to said second logic level potential when an increased load is applied to said stepping motor for producing a drive pulse of increased power, with the timing of said increased power drive pulse being such tha rotation of said stepping motor rotor in response thereto will occur only if said rotor has failed to be rotated by a drive pulse applied immediately prior to said transition of the status control signal to said second logic level potential, and such that the effect of said increased power drive pulse will be substantially cancelled by an electromotive force generated in said drive coil by angular oscillation of said rotor if said rotor has been rotated by said drive pulse applied immediately prior to said transition of the status control signal to said second logic level potential.

22. In an electronic timepiece having a standard frequency timebase signal source, a frequency divider circuit responsive to a timebase signal produced by said standard frequency timebase signal source for producing a unit time signal, drive circuit means for producing a drive signal, a stepping motor having a drive coil and a rotor, said stepping motor being periodically actuated by said drive signal to rotate said rotor through a predetermined angle, and time indicating means driven by said stepping motor for indicating time information, a drive control system for controlling said drive signal in accordance with a load torque applied to said stepping motor, comprising:

control and detection circuit means coupled to said drive circuit means and said frequency divider circuit for detecting the amplitude of a detection signal voltage developed across said drive coil during a sampling interval of predetermined duration occurring after each periodic actuation of said stepping motor by said drive signal, said control and detection circuit means operating in a normal detection status when a relatively low load torque is applied to said stepping motor and in an increased drive detection status when a relatively high load torque is applied to said stepping motor, said normal detection status being characterized in that a drive signal of relatively low power is applied to said drive coil and in that a transition to said increased drive detection status is executed by said control and detection circuit means when the amplitude of said detection signal falls below a first predetermined amplitude, and said increased drive detection status being characterized in that a drive signal of relatively high power is applied to said drive coil and in that a transition to said normal detection status is executed by said control and detection circuit means when the amplitude of said detection signal goes above a second predetermined amplitude.

23. An electronic timepiece according to claim 22, in which said control and detection circuit means comprises a waveform converter circuit coupled between said frequency divider circuit and said drive circuit, and a detection circuit coupled to receive said detection signal from said drive coil, and in which said detection circuit produces a status control signal which is at a first logic level potential during said normal detection status and is at a second logic level potential during said increased drive detection status, said status control signal being applied to said waveform converter circuit, which is responsive thereto for applying a first drive input signal to said drive circuit when said status control signal is at said first logic level potential and for applying a second drive input signal to said drive circuit when said status control signal is at said second logic level potential, said drive circuit being responsive to said first drive input signal for applying a drive signal of relatively low power to said drive coil, and responsive to said second drive input signal for applying a drive signal of relatively high power to said drive coil.

24. An electronic timepiece according to claim 23, in which each of said sampling intervals begins after a predetermined time interval following the start of one of said periodic actuations of said stepping motor by said drive signal, and in which the duration of said predetermined time interval is identical in said normal detection status and in said increased drive detection status, and furthermore in which said second predetermined amplitude of said detection signal is higher than said first predetermined amplitude thereof.

25. An electronic timepiece according to claim 23, in which each of said sampling intervals in said normal detection status is initiated after a first pedetermined time interval following the start of one of said periodic actuations of said stepping motor by said drive signal, and in which each of said sampling intervals in said increased drive detection status is initiated after a second predetermined time interval following the start of one of said periodic actuations of said stepping motor by said drive signal, and in which the duration of each of said first predetermined time intervals is different from that of each of said second predetermined time intervals, and furthermore in which said first predetermined amplitude and said second predetermined amplitude of said detection signal are identical.

26. An electronic timepiece according to claim 23, in which said drive signal comprises a train of drive pulses of alternating polarity.

27. An electronic timepiece according to claim 26, in which each of said drive pulses consists of a single uninterrupted pulse, and in which the duration of each of said drive pulses is increased and decreased in order to increase and decrease respectively the drive power applied to said stepping motor.

28. An electronic timepiece according to claim 26, in which each of said drive pulses comprises a burst of a predetermined number of relatively high frequency pulses, and in which the duty cycle of said relatively high frequency pulses is increased and decreased respectively in order to increase and decrease the drive power applied to said stepping motor.

29. An electronic timepiece according to claim 26, in which the timing of said sampling intervals is determined by a sampling signal generated by said waveform converter circuit, comprising a pulse of predetermined duration which is generated after a predetermined time interval following each of said drive pulses, said detection circuit being responsive to said sampling signal for comparing the amplitude of said detection signal from said drive coil with a detection threshold voltage level.

30. An electronic timepiece according to claim 29, in which said waveform converter circuit further generates an interruption signal comprising a pulse of predetermined duration which is generated during at least a portion of the duration of a sampling signal pulse, said drive circuit being responsive to said interruption signal in conjunction with said drive input signal for establishing an open circuit condition across said drive coil during each of said interruption signal pulses, and for establishing a short-circuit condition across said drive coil from the termination of a drive pulse to the start of an interruption pulse and from the termination of an interruption signal pulse to the start of the succeeding drive pulse.

31. An electronic timepiece according to claim 30, and further comprising means for connecting a predetermined high value of resistance between at least one end of said drive coil and ground potential during each of said interruption pulses.

32. An electronic timepiece according to claim 31, in which said connecting means comprises a transistor connected between ground potential and one terminal of a fixed resistor, with the other terminal of said resistor being connected to said at least one end of the drive coil, and with said interruption signal being applied to a control terminal of said transistor.

33. An electronic timepiece according to claim 29, in which each of said sampling signal pulses is generated during a predetermined one of a plurality of cycles of damped angular oscillation executed by said rotor of said stepping motor subsequent to the termination of a drive pulse.

34. An electronic timepiece according to claim 33, in which the timing of initiation of said sampling signal pulse during said cycle of angular oscillation of the rotor is controlled by said waveform converter circuit in accordance with a logic level potential of said status control signal.

35. An electronic timepiece according to claim 34, in which said waveform converter circuit is responsive to a transition of said status control signal from said first logic level potential to said second logic level potential when an increased load is applied to said stepping motor for producing a drive pulse of increased power, with the timing of said increased power drive pulse being such that rotation of said stepping motor rotor in response thereto will occur only if said rotor has failed to be rotated by a drive pulse applied immediately prior to said transition of the status control signal to said second logic level potential, and such that the effect of said increased power drive pulse will be substantially cancelled by an electromotive force generated in said drive coil by angular oscillation of said rotor if said rotor has been rotated by said drive pulse applied immediately prior to said transition of the status control signal to said second logic level potential.

36. An electronic timepiece according to claim 34, and further comprising phase initialization means coupled to said waveform converter circuit for providing automatic adjustment of the phase of said interruption signal and said sampling signal to suitable values when a supply voltage is initially applied to said electronic timepiece circuit.

37. An electronic timepiece according to claim 36, in which said phase initialization means comprises:

a counter circuit having a plurality of output leads;

a first flip-flop circuit coupled to receive a counter control signal from said detection circuit, said first flip-flop circuit being responsive to said control signal for being reset to produce an output at a first logic level potential, said counter control signal being produced by said detection circuit when said detection signal amplitude exceeds said detection threshold level;

a first gate circuit coupled to receive said output signal from said first flip-flop circuit and a first clock signal comprising a pulse which is generated each time one of said drive pulses is produced, and having an output terminal coupled to a clock input terminal of said counter circuit, said first gate circuit being inhibited from transferring said first clock signal to said counter circuit when said first flip-flop circuit output is at said first logic level potential, and being enabled to pass said first clock signal to said counter circuit when said first flip-flop circuit output signal is at a second logic level potential;

a second flip-flop circuit having an input terminal connected to said second logic level potential and a clock input terminal connected to receive a second clock signal, whereby an output terminal of said second flip-flop circuit goes initially to said second logic level potential immediately subsequent to initial application of supply power to said electronic timepiece circuit, and thereafter goes to said first logic level potential;

a second gate circuit coupled to said second logic level potential and to said output terminal of the second flip-flop circuit, for producing a signal comprising a pulse of short duration at said second logic level potential when supply power is initially applied to said timepiece circuit;

said second gate circuit output being coupled to said first flip-flop circuit for setting said first flip-flop circuit to an initial condition in which said second logic level potential is initially applied therefrom to said first gate circuit, and further being coupled to said counter circuit for setting a count state thereof to a predetermined initial value when power is initially applied to said electronic timepiece circuit;

phase shifting circuit means comprising a shift register circuit coupled to receive a third clock signal, and responsive thereto for producing a plurality of signals of successively varying phase;

sampling signal generating circuit means comprising first selector gate means and second selector gate means coupled to receive said output signals from said counter clock and said phase shifting circuit, said first selector gate means producing an output signal comprising a pulse whose timing is determined within a first range of phase variation in accordance with the count state of said counter circuit, and said second selector gate means producing an output signal comprising a pulse whose timing is determined within a second range of phase variation in accordance with said count state of said counter circuit; and third selector gate circuit means coupled to receive said outputs of said first and second selector gate means, and controlled by said status control signal for selecting the output of said first selector gate means when said status control signal is at said first logic level potential and for selecting the output of said second selector gate circuit means when said status control signal is at said second logic level potential, the output of said third selector gate circuit means being utilized as said sampling signal.

38. An electronic timepiece comprising, in combination:

a standard frequency oscillator for providing a timebase signal;

a frequency divider circuit responsive to said timebase signal for providing a unit time signal and a plurality of timing signals;

a normal drive input signal generating circuit responsive to said unit time signal for providing a normal drive input signal;

an increased drive input signal generating circuit responsive to said unit time signal for providing an increased drive input signal comprising a pulse train of greater pulse width than that of pulses in said normal drive input signal;

selector circuit means coupled to receive said normal drive input signal and said increased drive input signal;

an interruption signal generating circuit responsive to a timing signal from said frequency divider circuit for producing an interruption signal, comprising a pulse of short duration which is generated after a predetermined time interval following the leading edge of a pulse of said normal drive input signal and said increased drive input signal;

a gate circuit coupled to receive said normal drive signal and said increased drive input signal from said selector circuit and further coupled to receive said interruption signal;

a stepping motor having a drive coil; time indicating means driven by said stepping motor for indicating time information;

a drive circuit having output terminals coupled to said stepping motor drive coil and having first input terminals coupled to receive said normal drive input signal and said increased drive input signal from said selector circuit and second input terminals coupled to an output terminal of said circuit;

a sampling signal generating circuit responsive to a timing signal from said frequency divider circuit for producing a sampling signal comprising a pulse of short duration synchronized with said interruption signal and overlapping said interruption signal pulse to at least a partial extent;

a detection circuit having input terminals coupled to said drive coil, said detection circuit being responsive to said sampling signal for detecting a detection signal voltage generated by said drive coil when an open-circuit condition is established between the terminals thereof by said drive circuit in response to said interruption signal applied through said gate circuit during a sampling interval of duration defined by the pulse width of a pulse of said sampling signal, said detection circuit being responsive to an increase of said detection signal voltage above a predetermined detection threshold during said sampling interval for producing a status control signal at a first logic level potential, and being responsive to said detection signal voltage being below said predetermined detection threshold level for producing said status control signal at a second logic level potential;

said selector circuit being responsive to said first logic level state of said status control signal for applying said normal drive input signal to said drive circuit and responsive to said second logic level state of said status control signal for applying said increased drive input signal to said drive circuit, said sampling signal generating circuit being responsive to said first logic level of the status control signal for producing sampling signal pulses at a first predetermined timing after the leading edge of each pulse of said normal drive input signal and responsive to said second logic level state of the status control signal for producing sampling pulse at a second predetermined timing after the leading edge of each pulse of said increased drive input signal, and said interruption signal generating circuit being responsive to said first and second logic level states of said status control signal for producing interruption signal pulses at a first and second predetermined timing respectively following the leading edge of a pulse of said normal drive input signal and said increased drive input signal respectively.

39. An electronic timepiece comprising, in combination:

a standard frequency oscillator circuit for providing a timebase signal;

a frequency divider circuit responsive to said timebase signal for producing a unit time signal and a plurality of timing signals;

a selector circuit coupled to receive timing signals from said frequency divider circuit and controlled by a status control signal, for producing a modulation signal of relatively low duty cycle when said status control signal is at a first logic level potential and producing a modulation signal of relatively high duty cycle when said status control signal is at a second logic level potential, said modulation signal comprising a pulse train of substantially higher frequency than said unit time signal;

a first gate circuit for receiving said modulation signal and said unit time signal, for thereby producing a drive input signal comprising periodically repeated bursts of pulses, by modulating said unit time signal with said modulation signal;

a stepping motor having a drive coil; time indicating means driven by said stepping motor for indicating time information;

circuit means coupled to receive said timing signals from said frequency divider circuit, for producing an interruption signal comprising a pulse of short duration generated after a predetermined time interval following each of said drive input signal pulse bursts, and for producing a sampling signal comprising a pulse of short duration synchronized with said interruption signal and at least partially overlapping a pulse of said interruption signal in time;

a second gate circuit coupled to receive said drive input signal and said interruption signal;

a drive circuit having first input terminals coupled to receive said drive input signal and second input terminals coupled to the output of said second gate circuit, and having output terminals coupled across said drive coil of the stepping motor, said drive circuit being responsive to said drive input signal for applying a drive signal of relatively low power to said drive coil when said modulation signal is of relatively low duty cycle and a drive signal of relatively high power to said drive coil when said modulation signal is of relatively high duty cycle, said drive circuit being further responsive to the output of said second gate circuit for establishing a short-circuit condition across said drive coil from the termination of each pulse burst of said drive signal to the start of a succeeding interruption signal pulse, and from the termination of an interruption signal pulse to the start of a succeeding drive signal pulse burst, and also for establishing an open-circuit condition across said drive coil during each of said interruption signal pulses;

a detection circuit having first and second input inverters coupled to said drive coil for detecting a detection signal produced by said drive coil when open-circuited by said drive circuit, said first input inverter producing an output signal when said detection signal amplitude exceeds a first predetermined threshold voltage thereof and said second input inverter producing an output signal when said detection signal amplitude exceeds a second predetermined threshold voltage thereof, said second threshold voltage being higher than said first threshold voltage, a second selector circuit coupled to receive said first and second input inverter output signals, being responsive to said first and second logic level states of said status control signal for transferring said output signals of said first and second input inverters respectively to an output terminal thereof, a third selector gate circuit coupled to receive the output of said second selector circuit and controlled by said sampling pulse for transferring output signals from said second selector circuit to an output terminal thereof during a sampling interval defined by the duration of a sampling signal pulse, and a flip-flop circuit for producing said status control signal, said flip-flop circuit being responsive to the output of said third selector circuit for producing said status control signal at said first logic level potential while output signals are produced from said third selector circuit and producing said status control signal at said second logic level potential in the absence of output signals being produced from said third selector circuit.

* * * * *